United States Patent
Kanazawa

(10) Patent No.: US 6,830,782 B2
(45) Date of Patent: Dec. 14, 2004

(54) HYDROPHILIC POLYMER TREATMENT OF AN ACTIVATED POLYMERIC MATERIAL AND USE THEREOF

(76) Inventor: Hitoshi Kanazawa, 28, Aza Harada, Fukushima-shi, Fukushima, 960-2156 (JP)

(*) Notice: Subject to any disclaimer, the term of this patent is extended or adjusted under 35 U.S.C. 154(b) by 0 days.

(21) Appl. No.: 09/914,441

(22) PCT Filed: Dec. 28, 2000

(86) PCT No.: PCT/JP00/09420

§ 371 (c)(1),
(2), (4) Date: Aug. 27, 2001

(87) PCT Pub. No.: WO01/48065

PCT Pub. Date: Jul. 5, 2001

(65) Prior Publication Data

US 2003/0087982 A1 May 8, 2003

(30) Foreign Application Priority Data

Dec. 28, 1999 (JP) .......................... 11-375055

(51) Int. Cl.[7] .................. H05C 1/00; H05H 1/00; C08J 7/04; C08J 3/28

(52) U.S. Cl. ............... 427/458; 427/535; 427/536; 427/538; 427/551; 427/553; 427/533; 433/8; 522/111; 522/112; 522/88; 522/150; 522/151; 522/153; 522/155; 522/157; 522/161; 522/162; 522/163; 522/164; 522/165; 522/166; 525/388

(58) Field of Search ................ 427/458, 2.9, 533, 427/535, 536, 538, 551, 553, 487, 488, 491; 433/8; 522/111, 112, 88, 79, 80, 150–166, 71, 74, 81; 525/388, 345, 57, 61, 54, 54.21, 54.23, 54.26

(56) References Cited

U.S. PATENT DOCUMENTS

| | | | | |
|---|---|---|---|---|
| 4,589,964 A | * | 5/1986 | Mayhan et al. | 522/85 |
| 4,678,838 A | * | 7/1987 | Janssen | 525/326.9 |
| 4,743,258 A | * | 5/1988 | Ikada et al. | 623/1.49 |
| 5,432,000 A | * | 7/1995 | Young et al. | 428/372 |
| 5,453,467 A | * | 9/1995 | Bamford et al. | 525/287 |
| 5,512,329 A | * | 4/1996 | Guire et al. | 427/508 |
| 5,578,073 A | * | 11/1996 | Haimovich et al. | 623/1.48 |
| 5,591,542 A | * | 1/1997 | Sakamoto et al. | 429/249 |
| 5,755,913 A | * | 5/1998 | Liaw et al. | 156/272.6 |
| 5,871,823 A | * | 2/1999 | Anders et al. | 427/512 |
| 5,889,073 A | * | 3/1999 | Zhang et al. | 522/3 |
| 6,042,737 A | * | 3/2000 | Basil et al. | 216/37 |
| 6,053,989 A | * | 4/2000 | Orillion et al. | 148/304 |
| 6,096,369 A | * | 8/2000 | Anders et al. | 427/2.3 |
| 6,200,626 B1 | * | 3/2001 | Grobe et al. | 427/2.24 |

FOREIGN PATENT DOCUMENTS

| | | |
|---|---|---|
| JP | 59-73842 | 4/1984 |
| JP | 62-19207 | 1/1987 |
| JP | 62-268900 | 11/1987 |
| JP | 1-248460 | 10/1989 |
| JP | 3-103448 | 4/1991 |
| JP | 4-136267 | 5/1992 |
| JP | 4-153231 | 5/1992 |
| JP | 5-283053 | 10/1993 |
| JP | 7-70929 | 3/1995 |
| JP | 7-90783 | 4/1995 |
| JP | 8-109228 | 4/1996 |
| JP | 8-13001 | 5/1996 |
| JP | 9-12752 | 1/1997 |
| JP | 9-143884 | 6/1997 |
| JP | 11-7937 | 1/1999 |
| JP | 11-67183 | 3/1999 |
| JP | 11-260335 | 9/1999 |

* cited by examiner

Primary Examiner—Susan Berman
(74) Attorney, Agent, or Firm—Scully, Scott, Murphy & Presser

(57) ABSTRACT

A method of modifying a polymeric material which comprises the steps of activation-treatment and a hydrophilic polymer-treatment, or comprises the steps of activation-treatment, a hydrophilic polymer-treatment, and monomer grafting in this order, or comprises the step of a solvent-treatment followed by these steps. Thus, the polymeric material, e.g., polyolefin, is improved in hydrophilicity, adhesion, etc. without lowering the practical strength thereof. The polymeric material thus improved in adhesion and other properties can be used in many applications where water absorption and adhesion are required, such as an absorption material, e.g., a wiping/cleansing material, a water retention material, a material for microorganism culture media, a separator for batteries (or cells), a synthetic paper, a filter medium, a textile product for clothing, a medical/sanitary/cosmetic supply, and reinforcing fibers for composite materials.

19 Claims, No Drawings

HYDROPHILIC POLYMER TREATMENT OF AN ACTIVATED POLYMERIC MATERIAL AND USE THEREOF

TECHNICAL FIELD

The present invention relates to a method of modifying the property of a polymeric material. More particularly, the invention relates to a method to improve the properties such as water absorption and adhesion, etc. of a polymeric material without lowering the practical strength of the material.

BACKGROUND ART

Because polyolefins such as polypropylene, polyethylene, etc. have excellent properties of light weight, large strength, good chemical resistance, etc., they are extensively used for films, non-woven fabrics, molded materials for automobile components and members of electrical apparatus, etc. On the other hand, polyolefin materials have a small polarity and a high crystallinity, which are derived from its chemical structure, thus they have a small hydrophilic property and a difficulty in chemical modification. Various surface activation treatments such as ozone treatment, plasma treatment, ultraviolet light irradiation, high voltage electric discharge, corona discharge, etc. have been carried out to improve the hydrophilic property and adhesive property of polyolefin materials. However, even if any method of them is employed to treat a polyolefin material, we cannot obtain an effective result that the treated material absorbs water as much as several times the weight of original material.

Various kinds of treatments have been proposed in order to improve the property of polymeric materials such as polypropylene, etc. For examples, the ozone oxidation treatment was examined to improve the property of metal plating, painting and adhesion (Japanese Laid-Open Patent Publication No. H3-103448 (1991)). However, when only the ozone treatment is employed to improve the property of the material, it needs very strict conditions which cause the lowering of the mechanical strength; this makes a problem that the treatment is not practical. Furthermore, it is impossible to give a large water absorption property to the material only by the ozone treatment.

Furthermore, it was proposed that vinyl monomers containing ester bonds were grafted to non-woven fabrics made of polyolefin and then, the ester bonds were hydrolyzed to form acid groups giving a hydrophilic property and an ion-exchange property (Japanese Laid-Open Patent Publication No. H11-7937 (1999)). However, the grafting of vinyl monomers to polyolefin to give a large hydrophilic property is not easily carried out by the proposed method. Still more, the method needs the hydrolysis treatment after the grafting, which causes a laborious problem.

On the other hand, a method to improve a hydrophilic property of non-woven fabrics made of polyolefin fibers by the treatment with hydrophilic resin in the presence of a persulfate was proposed (Japanese Laid-Open Patent Publication No. H11-67183 (1999)). Although this method gave practically a hydrophilic property to non-woven fabrics, the hydrophilic property is not durable in use. In addition, this method was not applicable for the improvement of hydrophilic property and adhesion property of films and molding materials except non-woven fabrics. For instance, the hydrophilicity given by this method is considerably lost by washing with a hot detergent solution.

It is known that a method to improve a hydrophilic property of non-woven fabrics by coating them with polyvinyl alcohol (Japanese Laid-Open Patent Publication No. H1-248460 (1989)). Although the hydrophilic property of the treated non-woven fabrics is high, its durability is very low because the treatment is only coating. In addition, the coated non-woven fabrics give a disadvantage in that when they are used as battery separators, they shrink and cause short-circuiting in the batteries.

The present inventor proposed a method to improve the surface property, or especially, the dyeability of polymeric materials, which is composed of activation treatment of the surface of polymeric materials, monomer grafting such as acryl amide, etc. on them and Hofmann rearrangement of the amide groups in grafts (Japanese Laid-Open Patent Publication No. H8-109228 (1997)). Although this method is available for improving the hydrophilic property of some polymeric materials, the kind of available polymeric materials is limited.

The present invention provides a method for improving a durable water absorption property, a hydrophilic property and an adhesion, etc. for a polymeric material without lowering the practical strength. The present invention also provides medical/sanitary/cosmetic supplies; disposable diapers, sanitary or other napkins, bandages, gauze and disinfectants and various water-absorption materials for cleaning, cleanser pack, etc., water retention materials useful for agriculture/greening in dry districts, materials for microorganism culture media, synthetic paper, filter media, battery separators with alkali/acid proofing, members of writing materials with an excellent absorption property of water-soluble ink, wiping/cleansing materials, orthodontic brackets, medical materials (artificial organs, artificial joints, medical tubes and the other molded materials with string or plate forms), polymeric materials with improved adhesive property and polymeric materials for composites.

DISCLOSURE OF INVENTION

The present inventor investigated the method for improving the property of polymeric materials such as a water adsorption property, a hydrophilic property, and an adhesion property, etc. and discovered that a combination of a solvent treatment, an activation treatment, a hydrophilic polymer treatment and a monomer grafting is effective for the improvement, and completed the present invention.

A first aspect of the present invention relates to the method for improving polymeric materials by (1) the step of activation-treatment and (2) the step of a hydrophilic polymer-treatment in this order.

A second aspect of the present invention relates to the method to improve polymeric materials by (1) the step of activation-treatment and (2) the step of a hydrophilic polymer-treatment and (3) the step of monomer grafting in this order.

A third aspect of the present invention relates to the method to improve polymeric materials by (1) the step of a solvent-treatment, (2) the step of activation-treatment and (3) the step of a hydrophilic polymer-treatment in this order.

A fourth aspect of the present invention relates to the method to improve polymeric materials by (1) the step of a solvent-treatment, (2) the step of activation-treatment, (3) the step of a hydrophilic polymer treatment and (4) the step of monomer grafting in this order.

The present invention also relates to the products prepared from the polymeric materials improved by the above methods; a water absorption material, a water retention material, a material for microorganism culture media, a synthetic paper, a filter medium, a battery separator, a member of writing materials (members made of polymer used for various kinds of pens with water-soluble ink, felt pens, brush pens, fountain pens and ball-point pens, etc.), a wiping/cleansing cloth, a disposal medical/sanitary/cosmetic supply (a diaper, a sanitary napkin, a bandage, a gauze, the other medical/sanitary supply and various cosmetic supplies for cleaning/cleansing pack), a material improved in adhesion property, an orthodontic bracket, a medical material (an artificial organ, an artificial joint, a medical tube and the other molding material of tube, string or plate), etc.

The present invention will be described in more detail.
(Polymeric materials)

Polymeric materials used in the present invention include the polymer material contained in each of a single polymer or a mixture of synthetic or natural polymers, a modified single polymer or polymer mixture, a material prepared by mixing or conjugating the polymers with glass, metal and carbon fiber, etc.

Both thermoplastic polymers and thermosetting polymers are used as synthetic polymers. Various methods for the preparation of these polymers are exemplified, and all polymers prepared by these methods can be used. For example, the following polymers are available; (1) polymers made by an addition polymerization; homopolymers or copolymers prepared by the polymerization of a single kind of monomer or a mixture of monomers selected from olefins, vinyl compounds except olefins, vinylidene compounds, the other compounds with C=C double bonds, (2) polymers made by polycondensation; a polyester and a polyamide, etc. or their mixture or modified polymers, (3) polymers made by addition polycondensation; phenol resin (containing Kynol (commercial name of Japan Kynol Co., Ltd.), urea resin, melamine resin, xylene resin, or their mixture or modified polymers, (4) polymers prepared by polyaddition; polyurethane, polyurea, and these mixture or modified polymers, (5) polymers prepared by the ring-opening polymerization; a homopolymer or a copolymer prepared by cyclopropane, ethylene oxide, propylene oxide, lactone and lactam, and these mixtures or modified polymers, (6) cyclic polymers; polymers prepared by the polymerization of divinyl compounds (e.g., 1,4-pentadiene) or diyne compounds (e.g. 1,6-heptadiyne) and these mixture or chemically modified polymers, (7) polymers prepared by isomeric polymerization; e.g., alternative copolymer of ethylene and isobutene, (8) polymers prepared by the electrolytic polymerization; a homopolymer or a copolymer prepared by pyrrole, aniline and acetylene, etc. and their mixture or chemically modified polymers, (9) polymers made of aldehydes and ketones, (10) poly(ethersulfone) and (11) polypeptides.

A single material or a mixture of cellulose, proteins and polysaccharides or these derivatives, etc. are given as natural polymers.

In the present invention, the polymers made by an addition polymerization described above are preferably used. Monomers used in an addition polymerization are not specially limited. A homopolymer or a copolymer of α-olefins such as ethylene, propylene, butene-1, pentene-1, hexene-1,4-methylpentene-1, octene-1, etc. are used.

In the present invention, vinyl compounds except olefins give the compounds with vinyl groups. For instance, the following compounds are given; vinyl chloride, styrene, acrylic acid, methacrylic acid, esters of acrylic or methacrylic acids, vinyl acetate, vinyl ethers, vinyl carbazole, and acrylonitrile, etc.

As compounds except olefins compounds containing vinylidene groups; vinilidene chloride, vinilidene fluoride and isobutylene are exemplified.

As the compounds with carbon-carbon double bonds except olefins, vinyl compounds and vinilidene compounds, the following compounds are given; maleic anhydride, pyromellitic dianhydride, 2-butene acid, tetrafluoroethylene, chlorotrifuluoro-ethylene, etc. and compounds with two or more vinyl groups, for instance, butadiene, isoprene and chloroprene, etc.

As preferable polymers made by the addition polymerization, homopolymers or copolymers of two or more monomers selected from these monomers or a mixture of these polymers can be suitably used. Especially preferable addition polymers are polyethylene, a copolymer of ethylene and the other α-olefin, polypropylene, a copolymer of propylene and the other α-olefin. These copolymers represent both of random copolymers and block copolymers. As the present invention is effective for the improvement of the hydrophilic property of polyolefins, which is especially difficult for a chemical treatment, polyolefins are preferably used.

As polymeric materials other than polyolefins, homopolymers or copolymers of monomers selected from vinyl compounds, vinylidene compounds or compounds with carbon-carbon double bonds; poly(methacrylate)s, poly(acrylate)s, polystyrene, poly tetrafluoroethylene, copolymers containing acrylonitrile (acrylic fiber and its molded product and ABS resin, etc.) and copolymers containing butadiene (synthetic rubber), etc., polyamides (contain-ing nylon and aliphatic or aromatic polyamides), polyesters (containing polyethylene terephthalate and aliphatic or all-aromatic polyesters), polycarbonate, polyurethane, polybenzoate, polyethersulfone, a carbon material such as carbon fiber, etc., various synthetic rubbers, wool, silk, etc. are preferably used.

As the polymers except the above ones, the following polymers are preferably used; poly(phenol) (commercial name, Kynol), poly(alkyl-p-hydroxybenzoate), polyimide, poly(benzimidazole), poly-(p-phenylene benzobisthiazole), poly-(p-phenylene benzbisoxazole), poly(benzothiazole), poly(benzoxazole), and the following fibers are preferably used; cotton, flax, hemp, ramie, jute, and other vegetable fibers, animal hair fibers except wool, cellulose acetate, regenerated cellulose (rayon, cupra, polynosic, etc.), vinylon, a copolymer of vinylalcohol and vinylchloride (polychlal; commercial name, Cordera) and casein fiber. In addition, mixtures or composites of these polymeric materials are preferably available.

The polymeric materials are not limited to the above exemplified ones but any of other polymers may be used for the present invention.

It is possible to improve the polymeric materials containing antistatic agents, stabilizers, nucleation agents, flame retardants, foaming agents and various additives which are usually added in polymeric materials by the present invention.

In the present invention, the form of polymeric materials to be improved is not limited. For instance, each of fiber, a woven fabric, a non-woven fabric, a cloth, a plate, a film, a tube, a rod, a hollow container, a case, a foamed material and a laminate is available. Especially, the water absorption property of fibers, woven fabrics, non-woven fabrics, cloth, films, and sheets can be easily improved. Porous films and sheets prepared for filtration mediums or synthetic papers are easily improved in a durable water absorption property. In addition, by improving members/parts of materials molded previously in a desired form, the polymeric materials which had not been used are enabled to be useful. For instance, when members of writing materials (ink holders, brushes of brush pens, felt-pens, autograph pens, ink-collector, etc.) made of polyolefins, polyesters and ABS resin are treated by the present method, the obtained members/parts become wettable with water-soluble ink and the performance of the writing materials can be advanced. When the other plastic materials (volts, nuts, chains, parts of electronics, caps, covers, etc.) are treated by the present method, their wettability and adhesion property are improved and the electrification is decreased.

Among fibers and fiber products, for instance, a polyolefin fiber, a polyester fiber, an acrylic fiber, a polyurethane fiber, a polyamide fiber such as nylon and polyaramide, a polyvinyl chloride fiber, a carbon fiber, silk, wool, etc. or woven fabrics and non-woven fabrics of these fibers are preferably used. Each form of fibers is available; a single kind of fiber, a mixture of two or more kinds of fibers, a mixed spinning fiber and a conjugate fiber (a sheath-core type fiber, a side-by-side aligned fiber, a multi-core fiber, an island-in the-sea type (archipelago type) and a hollow-segment-pie fiber, etc.).

(Activation Treatment Process)

In the present invention, the activation treatment process is to introduce functional groups containing oxygen or nitrogen, etc. or unsaturated bonds into the surface of the polymeric materials by various treatments such as ozone treatment, ultraviolet light irradiation treatment, discharging process, etc. It is not necessary to put vinyl monomers or other organic compounds in this process.

The extent of the activation treatment is not especially limited; it depends on the purpose of the treatment. An infrared spectroscopy is employed to see the extent of the activation treatment. For example, a ratio of the absorbance due to carbonyl groups introduced in materials to that due to the crystalline region which is not changed by the treatment is estimated by the base line method and it is used to see the extent of the oxidation by the activation treatment.

In the present invention, observing the absorbance due to carbonyl groups before and after the treatment, the extent that a trace of the formation of carbonyl groups is made sure, which suggests an oxidation, is enough and preferable for the activation treatment. For instance, in the case of polypropylene, it is preferable that the ratio of the absorbance at around 1710 $cm^{-1}$ due to the carbonyl groups introduced in the polymer to the absorbance at around 973 $cm^{-1}$ due to the methyl groups unchanged in the crystalline region is about 0.2 or less.

It is preferable that the polymeric materials are washed with appropriate solvents to remove the impurities before the activation treatment. For instance, polyolefins, polyvinyl chloride and polyvinylidene chloride, etc. are preferably washed with methanol and toluene. Cellulose acetate, nylons, polyesters, polystyrene, acrylic resin, polyvinyl acetate, polycarbonate, polyurethane, etc. are preferably washed with alcohols (methanol or ethanol). It is preferable that cellulose materials such as cotton, hemp, rayon, cuprammonium rayon, etc. are washed with alcohols after washing with detergents.

As a method of activation treatments, each of ozone treatment, plasma treatment, ultra-violet right irradiation treatment, high voltage electric discharge treatment and corona discharge treatment are available.

(Ozone Treatment)

The ozone treatment is to carry out a chemical reaction, mainly oxidation of the surface of polymeric materials with ozone molecules upon contact with ozone in order to improve the polymeric materials.

The ozone treatment is carried out by exposing polymeric materials to ozone. Any methods of ozone treatment are available; for instance, to put a polymeric material under the atmosphere of ozone for a given time or to put a polymeric material in the stream of ozone, etc.

Ozone is produced by passing air, oxygen, or gas containing oxygen such as oxygen-added air through an ozone generator. The ozone treatment is carried out by introducing the obtained gas containing ozone into a reaction vessel or a container in which a polymeric material is involved. The conditions of ozone treatment such as a concentration of ozone in a gas containing ozone, an exposure time and temperature, etc. are appropriately determined considering a kind and form of a polymeric material and the aim of the surface improvement. Usually, an ozone concentration from 0.1 to 200 mg/l, a temperature from 10 to 80° C. and a reaction time from 1 minute to 10 hours are applicable. For example, the treatment with the ozone concentration from 10 to 40 $g/m^3$ and a time from about 10 to 30 minutes at room temperature is available for the treatment of polypropylene and polyvinyl chloride fibers. When a polymeric material is a film, a treatment with an ozone concentration of 10 to 80 $g/m^3$ and the time from about 20 minutes to 3 hours is available. When air is used instead of oxygen, the ozone concentration becomes about a half of that with oxygen.

It is considered that hydroperoxide groups (—O—OH), etc. are formed and some of them are changed to hydroxide groups and carbonyl groups on the surface of a polymeric material by the reaction, mainly oxidation, with ozone treatment.

(Plasma Treatment)

A plasma treatment is carried out to introduce functional groups containing oxygen, nitrogen, etc. to the surface of materials; a polymeric material is put in a vessel containing a gas such as argon, neon, helium, nitrogen, carbon dioxide, oxygen and air, etc. and it is exposed to the plasma generated by a glow discharge. It is considered that radicals are generated on the surface of the polymeric material by the attack of the plasma. Subsequently, the radicals are exposed to air and reacted with oxygen to form carboxylic groups, carbonyl groups and amino groups, etc. on the surface of the polymeric material. The plasma treatment under a low pressure of nitrogen, oxygen or air can produce functional groups directly in the polymeric material.

Methods of the electric discharge are classified in (1) a direct current discharge, (2) a radio-wave discharge, and (3) a microwave discharge.

(Ultraviolet Radiation Treatment)

Ultraviolet radiation treatment is a method to irradiate an ultraviolet (UV) light to the surface of polymeric materials. Low-pressure mercury lamps, high-pressure mercury lamps, super high-pressure mercury lamps, xenon lamps and metal halide lamps are employed as a UV light source. It is effective that a polymeric material is treated with a solvent which can absorb UV light before the UV irradiation. Although any wave length of UV light is available, that of around 360 nm is preferable to decrease the deterioration of the material. The following is considered. When a UV light is irradiated to a polymeric material, a part of the light is absorbed by the chemical structure such as double bonds, etc. in the surface of the polymeric material and some chemical bonds are broken to produce radicals by the absorbed energy. The resulting radicals are considered to produce carboxylic groups or carbonyl groups via peroxides by the bonding of oxygen in air.

(High Voltage Electric Discharge Treatment)

A high voltage electric discharge treatment is as follows. A polymeric material is put on a belt conveyor roller equipped in a tunnel-shaped instrument and the material is carried by the belt. A high voltage such as several hundred thousands volts is put between a lot of electrodes attached to the inner wall of the instrument, which makes an electric discharge in air. It is considered that the electric discharge activates the oxygen in air and the surface of the material, and the oxygen incorporated into the material forms polar groups in the polymeric material.

(Corona Discharge Treatment)

A corona discharge treatment is as follows. A high voltage of several thousands volts is given between a grounded metal roller and knife-shaped electrodes which are aligned in several millimeter intervals to the metal roller. A polymeric material is passed through the space between these electrodes where the corona discharge is generating. This method is suitable for films or thin materials.

The methods except the ozone treatment are based on an energy irradiation. When a polymeric material has a part which makes a shadow for the irradiation, some techniques are necessary to treat the part by the irradiation. Therefore, the ozone treatment is preferable for the treatment of materials such as a non-woven fabric and a fiber-assembled material which gives shadow parts derived from the material's structure. In addition, the ozone treatment is economical and preferable because of the inexpensive facility A polymeric material activated by the ozone treatment, etc. is subsequently treated by a hydrophilic polymer treatment. Further more, the material treated by a hydrophilic polymer is treated by a monomer grafting in the Aspects 2 and 4 of the present invention.

(Solvent Treatment)

In order to make the activation treatment more effective, "solvent treatment" is preferably carried out before the activation treatment.

The solvent treatment is to dip a polymer material in a solvent which has a poor solubility of it under the condition that the material is not dissolved in it. A polymeric material is dipped in such a solvent for about 1 minute to 60 minutes at a temperature range of room temperature to about 60° C., and the material gives a weight increase of 0.2 to 10% of the original weight without any deformation. This process can be completed by drying the material quickly after dipping in the solvent. The solvent treatment is not always necessary when the polymeric material is a non-woven fabric or fibers. But, this treatment is very effective for the treatment of a material with a small surface area such as films and plates, or for a material containing a considerable amount of antioxidants or other additives. In the case of polypropylene, the material is immersed in a liquid for a solvent treatment (such as toluene, xylene, decalin, tetralin, cyclohexane, etc.) for 1 to 30 minutes in the range of room temperature to 50° C., and the surface of the material is dried. Subsequent treatment should be carried out soon after the solvent treatment. As a liquid for the solvent treatment of polyethylene, decalin, tetralin, xylene, and 1-chloronaphthalene, etc. are effective. For each of the other polymers, a combination of a solvent and a temperature which gives no solubility of the polymer should be examined.

For example, a non-woven fabric made of polyolefin fiber with a circle cross section of a diameter of about 5 to 10 $\mu$m is immersed into toluene for 2 minutes at room temperature, and is squeezed, and remaining toluene is removed by a centrifugation. Then, the material is dried by an electric fan; when the toluene on the surface of the material seemed to be evaporated apparently, the solvent treatment is finished. In the case of polyolefin films or plates and the other molded materials, they are immersed in toluene for 10 to 30 minutes at 50° C., squeezed as described above, and dried. In these cases, the weight increase is from about 1% to 5%.

(Hydrophilic Polymer)

In the present invention, "hydrophilic polymers" represents water-soluble polymers or polymers which are not soluble in water but have a hydrophilic property. Specific examples of polymers are as follows; poly(vinyl alcohol), sodium carboxymethyl cellulose, ethylene-vinyl alcohol copolymer, poly(hydroxyethyl methacrylate), poly($\alpha$-hydroxy vinyl alcohol), poly(acrylic acid), poly($\alpha$-hydroxy acrylic acid), poly(vinyl pyrrolidone), poly(alkylene glycol)s such as poly(ethylene glycol) and poly(propylene glycol), starch such as potato starch, corn starch, wheat starch, etc., glucomannan, silk fibroin, silk sericin, agar, gelatin, egg white, sodium arginate, etc. These sulfonates can also be available.

(Hydrophilic Polymer Treatment)

It is preferable that the hydrophilic polymer treatment of a polymeric material made by the activation treatment is carried out in the presence of catalysts or initiators (generically, they are called "initiators", and used similarly in the monomer grafting).

The following initiators are exemplified; peroxides (benzoyl peroxide, t-butylhydroxy peroxide, di-t-butylhydroxy peroxide, etc.), cerium ammonium nitrate (IV), persulfates (potassium persulfate, ammonium persulfate, etc.), oxidation-reduction initiators (oxidants; persulfates, hydrogen peroxide, hydroperoxide, etc. and inorganic reductants; copper salts, iron salts, sodium hydrogen sulfite, sodium thiosulfate, etc. or organic reductants; alcohols, amines, oxalic acid, etc. and these mixture, and oxidants; hydrogen peroxide, etc. and inorganic reductants; copper salts, iron salts, sodium hydrogen sulfite, sodium thiosulfate, etc., or organic reductants; dialkyl peroxide, diacyl peroxides, etc. and reductants; tertiary amines, naphthenates, mercaptans, organometallic compounds (triethyl aluminium, triethyl boron, etc. and these mixture), the other usual initiators of radical polymerization, etc.

In the hydrophilic polymer treatment process, it is preferable to use a hydrophilic polymer in the solution state. A water-soluble polymer is used as an aqueous solution. When a hydrophilic polymer is not soluble easily in water, it can be used as a solution in an adequate solvent. The use of water-soluble polymers is explained below.

When a treatment with a water-soluble polymer is carried out in the absence of an initiator, a polymeric material finished by the activation treatment is put in an aqueous solution of the water-soluble polymer.

When a treatment with a water-soluble polymer is carried out in the presence of an initiator, first, an aqueous solution of the water-soluble polymer is prepared. Then, if the initiator is water-soluble, a given amount of it is dissolved in the aqueous solution of the water-soluble polymer. If the initiator is not dissolved in water, it is dissolved in an organic solvent such as alcohols or acetone which are miscible with water, and then, the solution is added in the aqueous solution of the water-soluble polymer. Then, a polymeric material finished by the activation treatment is put in the solution of the water-soluble polymer and the initiator. The inner atmosphere of the reaction vessel is desirable to be substituted with nitrogen gas, but the nitrogen atmosphere is not always necessary for a usual treatment.

The temperature is not limited for the treatment with a water-soluble polymer and an initiator, usually, the temperature of 10°C. to 80° C. is available, but that of 60° C. to 90° C. is more preferable. The treatment for a long period of time (e.g.,.about 12 hours) at a high temperature is preferably carried out in order to obtain a durable hydrophilicity of a polymeric material. A characteristic of the present invention is as follows. Even when the amount of a hydrophilic polymer bound to a polymeric material in the hydrophilic polymer treatment is too small to be analyzed by usual analytical methods, a hydrophilicity of the polymeric material can be effectively improved by the present invention. Besides, as a ratio of a surface area of a polymeric material depends on the kind of the material, for instance, a percentage of weight increase in a treated material is largely dependent on each material. As a molded polymeric material has a small specific surface area, even when the percentage of the weight increase in the treated material becomes a very small value less than 1 wt %, an effective modification can be obtained. In the case of thin films, the percentage of the weight increase in the treated material becomes larger as compared with a thick molded product. In the treatment of a material with a large specific surface area such as a non-woven fabric, the material of a weight increase less than 5 wt % gives an excellent improvement in the hydrophilicity. However, the present invention is not limited by these values.

(Monomer Grafting Treatment)

In the present invention, the monomers for grafting are desirable to have at least one carbon-carbon double bond, for instance, vinyl compounds or similar compounds to them are preferable, although the other monomers which polymerize are available. Hydrophilic monomers are preferable for the present treatment. As hydrophilic monomers, at least a single monomer or a mixture of monomers selected from the following monomers are preferably used; acrylic acid, methacrylic acid, vinyl acetate, 2-butene acid, ethylene sulfonic acid, hydroxyalkyl acrylate, hydroxyalkyl methacrylate, acryl amide, vinyl pyridine, vinyl pyrrolidone, vinyl carbazole, maleic anhydride and pyromellitic dianhydride. In the present invention, the use of acrylic acid or methacrylic acid is especially desirable to obtain a polymeric material with a chemical resistance and a durable water absorption property.

It is a characteristic feature of the present invention that even if a slight amount of hydrophilic polymer is bound to a polymeric material, an effective improvement in the hydrophilic property of the material can be obtained. As mentioned above, an effective hydrophilicity is improved for a thick molded product even when a weight increase in a polymeric material by grafting is a value much less than 1 wt %. In the treatment of a film material, the weight increase by grafting is more than that of a thick material. In the grafting of a non-woven fabric, the weight increase less than 5 wt % gives a good hydrophilicity. However, the present invention is not limited by these values.

In addition, as monomers with low hydrophilicity such as vinyl monomers e.g., esters of acrylic acids, esters of methacrylic acids, vinyl acetate, styrene, etc. can also be used. The use of only hydrophilic monomers is preferable, but, sometimes, the use of a mixture of a hydrophilic monomer and a low hydrophilic monomer increases the percentage of grafting and as a result, the hydrophilic monomer residues in the graft can improve a hydrophilicity of the treated polymer material.

It is desirable that a monomer grafting to a polymer material is made by the heating or the UV irradiation in the presence of initiators. An initiator can be selected from those used in "the hydrophilic polymer treatment". When acrylic acid is used as a monomer, a water-soluble initiator such as cerium ammonium nitrate (IV) or potassium persulfate is preferably used. A water-insoluble initiator such as benzoyl peroxide or AIBN is first dissolved in methanol or acetone and the solution is mixed with water. The final solution was used for the treatment. In the grafting by a UV irradiation, a photo-sensitizer such as benzophenone and hydrogen peroxide can be used instead of the initiators mentioned above.

A grafting of monomers is carried out as follows. First, when a water-soluble initiator is used, the amount necessary for the treatment is dissolved in water. If a water-insoluble initiator is used, it is dissolved in an organic solvent such as alcohols and acetone which is miscible in water, and the solution was mixed with an appropriate amount of water, as taking care the precipitation of the initiator. The mixing ratio of water to an organic solvent is not especially limited. For instance, a volume ratio of water/acetone=2/3 is preferable in a mixture of water and acetone, and in a mixture of water and methanol, a volume ratio of water/methanol=1/1. Each of a material finished by an activation treatment and a hydrophilic polymer treatment, and a material finished by a solvent treatment, an activation treatment and a hydrophilic polymer treatment is added in a solution of an initiator, and then a monomer is added in the mixture. It is desirable that the reaction vessel is under a nitrogen atmosphere, but the present treatment can be made under a usual air atmosphere for convenience. A thermal polymerization is carried out by setting a reaction mixture in a thermostatted bath for a given time at a given temperature. For example, it is set for 30 minutes to 6 hours at 80° C. When a polymer material is not sunk in a reaction mixture, it is desirable that the material is sunk in the reaction mixture by putting an appropriate glass plate or vessel on it. On the other hand, in the case of a photo-polymerization, a Pyrex glass-made reaction vessel involving a reaction mixture is irradiated by an UV light for 30 minutes to 6 hours at 30° C. Various UV lamps are available, for instance, a high pressure mercury lamp, H400P produced by Toshiba Co., Ltd. is preferably used. UV light of about 360 nm monochromated by a filter is applicable, but a whole range of UV light from a UV lamp can also be used. A preferable distance between a reaction vessel and a light source is from 10 cm to 30 cm. When a polymer material is not sunk in a reaction mixture, an appropriate glass plate or vessel is put on it for sinking the material in the reaction mixture.

When a reaction is finished, a polymeric material is taken out of the reaction mixture and is washed with water or an aqueous detergent solution, rinsed well with water and dried. An example of a typical mixing of the reactants is given as follows; a polymeric material 40–80 g, an initiator 0.10–1.0 g and a solvent (mainly, water) 400 ml–800 ml.

As an example of a monomer mixture including a hydrophilic monomer, a mixture of acrylic acid 8 volume and methyl methacrylate 2 volume is applicable. When vinyl acetate or styrene is used, a hydrolysis or a sulfonation should be carried out to improve the hydrophilicity after the grafting.

(Applications)

Properties such as hydrophilicity, water absorption property, water retention property, adhesion property and chemical resistance, etc. are extremely improved in a polymeric material treated by the present invention. The polymeric materials improved by the present invention can be used for many applications because of their characteristic properties. As an adhesion property of a polymeric material is improved, for example, it can be bonded to paper, wood, metal, etc. with general adhesives such as starch, poly(vinyl acetate), epoxy resin, and poly(cyanoacrylate), etc. The present invention is applicable for materials which are necessary for an adhesion property. Furthermore, the present invention is effective for the improvement of polyolefins such as polypropylene and polyethylene whose improvement is known to be difficult and other many kinds of polymeric materials. The water absorption property of a non-woven fabric of a polyolefin or that of a mixture of a polyolefin and another polymer can be improved to give water absorption of 7 to 10 times as much as the original weight. In addition, the improved materials give a good adhesion property and resistances to alkalis, acids and oxidation.

Several applications are described below, but still other applications are also possible.

(1) Battery Separators

The polymer materials improved by the method of the present invention, especially non-woven fabrics of polyolefins such as polypropylene and polyethylene or non-woven fabrics of a mixture of polyolefins and the other polymers are very suitable for battery separators because they give excellent properties in water absorption, adhesion property, resistances to alkalis, acids and oxidation. They give a water absorption ability of 7 to 10 times as much as the original weight and a good absorption ability of electrolytic solutions.

(Alkali Battery Separators)

As alkali battery separators are excellent for a charging-discharging property, an overcharge-overdischarge property and have a long life-time and a repetitive use, they are extensively used in a lot of electronics which need a small size and light weight. The battery with higher capacity is expected. These characteristics of the alkali battery largely depend on the property of the battery separator. The following requirements are desirable for alkali battery separators; an affinity to electrolytic solutions (alkali solutions), a large liquid-absorption rate, a good liquid-retention ability, resistances to alkalis and acids which are durable for the repetitive charge/discharge process, an electric insulation to prevent a short-circuiting, a low electric resistance when they absorb electrolytic solutions, a good permeability for passing gas and ions released in batteries, a thin size suitable for small batteries, a uniform thickness, and a high tensile strength, etc. Non-woven fabrics of polyolefins improved in hydrophilic property and resistances to alkalis and acids are preferable for battery separators satisfying these requirements.

(Lead Storage Battery Separators)

An application for a lead storage battery is explained below.

Lead storage batteries are extensively used for cars and machines because they have a good charge/discharge property, a good overcharge-overdischarge property and a long life time, and they can be used repeatedly. A production of a lead storage battery with a large capacity is expected. These characteristics for a lead storage battery largely depend on the property of battery separators. The following requirements are desirable for lead storage battery separators; an affinity to electrolytic solutions (an aqueous sulfuric acid solution of about 40 wt %), a large liquid-absorption rate, a high liquid-retention property, resistances to alkalis and acids, durability in repeated charge/discharge processes, an electric insulation to prevent a short-circuiting, a low electric resistance when they absorb electrolytic solutions, a good permeability for passing gas and ions released in batteries, a thin size suitable for small batteries, an uniform thickness, and a high tensile strength, etc.

At present, non-woven fabrics containing glass fiber is used for a separator of a lead storage battery. Separators of a mixture of glass fiber and cellulose fiber bounded with a resin are also proposed (Japanese Laid-Open Patent Publication No. S59-73842 (1984)), and the following separator is also proposed; a mixture of powder of inorganic materials and a glass fiber is further more mixed with an acid-resistant synthetic fiber, and which are bound by a resin binder (Japanese Laid-Open Patent Publication No. H8-130001 (1996), Japanese Laid-Open Patent Publication No. H11-260335 (1999)). These separators are heavy and expensive. In addition, there is a problem that the resin used for the binding is exfoliated. On the other hand, a lead-storage battery separator made of non-woven fabric of polyolefins gives a low-cost, a lightweight, and a high mechanical strength. When a separator made of synthetic pulps (non-woven fabrics of polyolefins) impregnated with a surfactant (Japanese Laid-Open Patent Publication No. H5-86562) is used, the surfactant is released in use and the absorption property of an electrolytic solution of the separator is decreased. An acid battery separator was prepared by an addition polymerization of a hydrophilic monomer and polyethylene glycol diacrylate to a synthetic pulp of polyolefins (Japanese Laid-Open Patent Publication No. S62-268900 (1987)). It was described that ammonium persulfate was used as an initiator and any usual methods for polymerization could be employed. However, it is impossible to bind another polymer to polyolefins by the usual polymerization methods proposed in this patent. It is considered that the polymer resin obtained by the polymerization of a monomer seemed to be impregnated into the synthetic pulp of polyolefins and the mixture made solidification. In this case, the long lifetime of the separator can not be expected because the polyolefin fibers should be separated from the polymer resin by the repeated charge/discharge process in the battery.

Thus, the present invention has been carried out to prepare a lead storage battery separator which gives no problems of separators used so far, a lead storage battery separator which gives a high absorption property of electrolytic solutions, resistances to alkalis and acids, a low-cost, a lightweight and a high mechanical strength, and these properties give an excellent durability because its hydrophilicity was made by a real chemical bonding.

(Non-Woven Fabrics for Battery Separator)

Non-woven fabrics for a battery separator prepared by the present invention are explained below. Webs for non-woven fabrics are not especially limited. Polyolefin resins are used as main materials for webs; non-woven fabrics prepared by various dry methods such as a spun bond, melt blow, spun lace, card, sintering, needle punch, cross layer, random weber, air-foaming and air-ray, or non-woven fabrics made by a wet paper machine, or woven fabrics made with warps and wefts are applicable. In addition, their laminates or bonded fabrics are also available.

A wet paper machine method has an advantage that fibers with various diameters or several kinds of fibers are mixed together at an arbitrary mixing ratio. Namely, fibers with various forms such as a staple form and a pulp form and fibers with various diameters from a fine fiber below 7 $\mu$m to a thick fiber are available in this method. This method gives webs of very excellent characteristics as compared with the other methods. On the other hand, as the spun bond method and the melt blow method give non-woven fabrics made of fine fibers, a separator made of these non-woven fabrics is favorable for preventing an electrical short circuit between a positive pole and a negative pole in a battery.

Especially, to improve a fine structure of a separator, polyolefin fibers with a diameter of 0.1 μm to 15 μm are preferable, and the laminate of a spun bond non-woven fabric and a melt brow fabric or their bonded materials are preferable for the battery separator.

A unit weight and a thickness of a non-woven fabric suitable for an alkali battery separator can be determined by considering the conditions such as a fiber diameter in a fabric, a retention property for electrolytic solutions, and a fine structure (a property to prevent a small electrical short circuit). As an alkali battery separator, a thin fabric gives a good wettability with electrolytic solutions and is favorable for a miniaturization of a battery. However, when a separator is too thin, it causes problems of a low mechanical strength and an electrical short circuit. In addition, when a separator is too thick or too high in density, it takes a long time to immerse the separator in an electrolytic solution and a problem in a charge and discharge process is caused. Furthermore, when a diameter of fiber in a non-woven fabric is very small, the following advantages are given; an increase in a strength for a needling, a prevention of a small electrical short circuit, an increase in an retention property of electrolytic solutions, and an improvement of a life cycle of a battery, but the following disadvantages are caused; a decrease in a permeability of oxygen generated from a positive pole at a charge process, an increase in an inner pressure of a battery and a degradation of a property of a battery at a rapid charge-discharge process.

As a separator of an alkali battery, a non-woven fabric with a pore size of 1–200 μm, a ratio of vacancy of 30–80 v/v %, a thickness of 20–500 μm, a fiber diameter of 1–100 μm, and a unit weight of 5–100 g/m$^2$ are preferably used. Considering these conditions, an alkali battery separator that has a large wettability with an electrolytic solution, a high retention property of an electrolytic solution and a high permeability of oxygen can be obtained.

On the other hand, a lead storage battery needs an appropriate thickness, a high strength and a large liquid retention property. As a separator of a lead storage battery, a non-woven fabric with a pore size of 1–200 μm, a ratio of vacancy of 30–80 v/v %, a thickness of 500–1200 μm, a fiber diameter of 1–100 μm and a unit weight of 100–300 g/m$^2$ is preferably used.

Batteries (or cells) suitable for the separators prepared by the present invention are as follows. Examples of primary batteries are an alkali-manganese battery using an alkaline electrolytic solution, a mercury cell, a silver oxide cell, an air cell, a silver chloride cell, a lithium battery, a manganese battery using an acid electrolytic solution, etc.

Examples of secondary batteries are an alkaline storage battery using an alkaline electrolytic solution (an Edison battery), a nickel-cadmium battery (a Jungner battery), a nickel-hydrogen battery, and a lead storage battery using an acid electrolytic solution, etc. Separators prepared by the present invention can be used instead of paper separators which have been so far used in batteries.

(2) Materials for Wiping/cleansing

At present, a disposable wiping/cleansing material prepared as follows mainly available on the market, that is, a conjugate fiber made with polyester fiber, polyolefin fiber and other synthetic fiber is mixed with rayon fiber which gives a hydrophilicity, and then, the mixed material is impregnated with a surfactant. When the disposable cleansing/wiping material is made with a polymer material improved in the water absorption property by the present invention, the material gives a lightweight, a high mechanical strength, a high absorption property of water and an aqueous surfactant solution and durability in use. It can be used repeatedly several times by washing with water.

(3) Water-Absorption Material

A material with a water absorption property prepared by the present invention is represented.

(4) Water Retention Material

A hydrophilic polyolefin non-woven fabric improved by the present invention is useful for a water retention material which is available for supplying water to plants. To prepare a water retention material, the material of woven fabrics, non-woven fabrics, fibers, and cut disposable fibers are available. The diameter of component fibers in these materials is preferably from 10 μm to 500 μm for convenience.

(5) Medical/Sanitary/Cosmetic Supply

For example, diapers, sanitary supplies, bandages, gauze, sanitary napkins, disinfecting patches/tapes, cosmetic supplies for cleaning/cleansing/face packing and padding, etc. are given. In addition, as the polymer materials improved by the present invention have a good affinity to a human body system, they are available for many kinds of medical accessories or supplies. For instance, vascular grafts, artificial joints, tube/thread/plate-like polymer materials, catheters, tubes or other items for draining, body fluid absorbing materials, contact lenses, lenses for goggles, bandages of synthetic fibers and instillation accessories are given.

The inner part of disposable diapers or sanitary supplies contains materials having a water absorption property which are made of pulp, starch and polyacrylic acid, etc. and the outside part of them is covered with a material having a water repellency which prevents the passing of urine, water and blood, etc. and the surface of the inner part is covered with polyolefin non-woven fabrics with a hydrophilic property. Water generated from a body is passed through the inner hydrophilic non-woven fabric and absorbed by the water absorption material. A hydrophilic polyolefin non-woven fabric is the most preferable material because it is strong and not easily broken in water. However, the method to give a hydrophilicity to the non-woven fabrics used in the inner material is only to dip them in surfactants or water-soluble reagents, which is easily removed by rinsing in water. In addition, the effect of surfactants to skins is worrying. Thus, a cheap, easy and durable method to improve a hydrophilicity of a polymeric material is expected. Polyolefin materials improved in a water absorption/retention property which are prepared by the present invention are the most favorable for the fabrics used for the cover of the inside of disposable diapers and sanitary supplies. In addition, polymer materials with a high water absorption property which are prepared by the present invention are also available for water absorption materials used as an inner pad of disposable diapers or sanitary supplies. The improved materials by the present invention are light in weight, mechanically strong and safety, and give a durability for repeating uses. In addition, polymer materials obtained by the present invention give a hydrophilic property or a water absorption property, and they are light and strong. As they can be impregnated with detergents, chemicals and adhesives, they are available for gauze, fiber products for wiping, disinfecting cloth patches or tapes, and the other cosmetic supplies. When they are used for disposable medical/sanitary/cosmetic supplies, each of a woven fabric or a non-woven fabric is preferably used as a material's form, and the unit weight and thickness of the material are appropriately selected. A diameter of fibers in a non-woven fabric, 1–500 μm is easily used.

(6) Internal Materials for Clothing/bed/bedclothes

The polymer materials having a hydrophilicity and a water absorption property obtained by the present invention are light in weight and mechanically strong. When their water absorption ability is controlled in a preferable extent, they are suitable for fiber products of clothes and an inner material for beds and bedclothes.

(7) Filter Mediums

Filter mediums of porous films made of polyolefins, polysulfone, and polyester, etc. give a mechanical strength and a low hydrophilicity as compared with paper filters. They are not available for the filtration of aqueous solutions because of the low hydrophilicity. At present, they are coated with surfactants or water-soluble polymers in order to improve the hydrophilicity. However, the hydrophilic layer of the filters is non-durable and is easily dissolved in filtrates in the process of filtration. When the hydrophilic treatment of the present invention is applied for the filter mediums, it is expected that filter mediums with a durable water absorption property are obtained.

(8) Materials for Microbial Culture Medium

As water retention materials obtained by the present invention give a high water absorption property, a large mechanical strength, and a large microbial fertility, they are suitable as the materials of a microbial culture medium. Various forms of materials such as woven fabrics, non-woven fabrics, fibers and cut disposable fibers are available. A diameter of component fibers in these materials is preferably from 10 $\mu$ to 500 $\mu$m.

(9) Members of Writing Materials

Most of writing materials such as various ball-point pens with water-soluble ink, felt-tip pens, brush pens and fountain pens contain members made of plastics. At present, plastic materials made of ABS resin, polyester and nylon are treated by a plasma treatment or a corona discharge treatment to improve the affinity to water-soluble ink and they are mainly used as members for writing materials. Instead of these materials, polyolefins such as polypropylene and polyethylene are improved and can be used for the members of writing materials, which give advantages of lightweight, safety, etc. The present invention makes it possible to improve the hydrophilicity of usual hydrophobic plastic materials and to use the improved materials for the plastic members of writing materials, which have a good absorption/retention property of water-soluble ink; for example, hydrophilic members such as ink-tanks, ink-collectors, heads of brush pens, ink-absorbing polyester fibers and polyurethane sponges can be prepared.

(10) Orthodontic Brackets

The present invention can improve an adhesion property of polymer materials. As this improvement is available for various materials which need a good adhesion property, such as composites and fibers used for fiber reinforced plastics, it is also available to improve the adhesion property of orthodontic brackets.

(11) Polymer Composites

The adhesion property of fibers mixed in polymer composites or in fiber reinforced plastics is improved and the fibers are applied for making strong polymer composites. The adhesion property of fibers mixed in polymer composites or in fiber reinforced plastics are improved by the present invention and they are applied for making strong polymer composites.

(12) Synthetic Papers

Synthetic papers made of polymer materials such as polyolefins (polyethylene and polypropylene, etc.) and polyester, etc. are whitened by adding air bubbles or fillers, and they are used as alternative papers. The present invention can improve a hydophilicity, an adhesion property and a printing property of synthetic papers.

(13) Materials with Improved Adhesion Property

In addition to the orthodontic brackets and the fibers used for composites, the property of the other materials such as various polymer films and molded materials is also improved. The adhesion property between the same kind of materials or different materials can be improved.

(14) Application of Hydrophilic Film

The present invention gives a high hydrophilicity to polymer films of polyolefins and polyester, etc. For instance, water-absorption polyester films give a good adhesion property and a wettability with water, and they show an anti-fogging property when they are put on glasses and mirrors.

BEST METHODS FOR CARRYING OUT THE INVENTION

The present invention is not limited to the embodiments described here or by the examples which follow.

Used materials, reagents and test/evaluation methods are given below.

(A) Polymeric Materials (1) Polypropylene non-woven fabric 1: Unit weight 40 g/m², thickness 0.30 mm (measured by a thickness gauge, Model H of Ozaki Seisakusho Co., Ltd., the other thicknesses are measured similarly) and a spunbonded non-woven fabric of fineness 2 d, with embossing finish. They were used in Examples 1, 2, 3, 8 and 9.

(2) Polypropylene non-woven fabric 2: Unit weight 22 g/m², thickness 0.18 mm, spunbonded non-woven fabric of fineness 2 d, with embossing finish. It was used in Example 7.

(3) Polypropylene non-woven fabric 3: Made by a wet paper machine method. Unit weight 45 g/m², thickness 0.31 mm and fineness 2 d. They were used in Examples 4, 5 and 6 and Comparative Examples 1 and 2.

(4) Polyester non-woven fabric: Polyethylene terephthalate-made, unit weight 15 g/m², thickness 0.15 mm and fineness 2 d. It was used in Example 11.

(5) Polyethylene film: Unit weight 15 g/m² and thickness 0.05 mm. It was used in Example 13.

(6) Polypropylene plain cloth: Numbers of warp 98/inch and weft 74/inch, filament fineness 3.3 d and thickness 0.12 mm. It was used in Example 12 and Comparative Example 3.

(7) Polypropylene film: Unit weight 18 g/m² and thickness 0.05 mm. They were used in Examples 14, 15, 16, 17, 22 and Comparative Examples 5 and 6.

(8) Polypropylene/polyethylene conjugated fiber-made non-woven fabric: Non-woven fabric made with a conjugated fiber of polypropylene and polyethylene. Unit weight 20 g/m², thickness 0.12 mm and fineness 2 d. It was used in Example 10.

(9) Cotton plain cloth: Yarn size (warp and weft, 40/1) and thickness 0.27 mm. It was used in Comparative Example 4.

(10) Polypropylene non-woven fabric 4: Produced by a wet paper machine method. Unit weight 151 g/m², thickness 1.00 mm and fineness 2 d. It was used in Example 23.

(11) Polypropylene non-woven fabric 5: Produced by a spunbond method. Unit weight 50 g/m², thickness 150 $\mu$m, fineness 1 d and fiber length=continuous filament. It was used in Example 29.

(12) Non-woven fabric of polyethylene/polyester conjugated sheath-core type fiber: Non-woven fabric made of conjugated sheath-core type fiber with a core of polyester and a sheath of polyethylene. Mixing ratio of polyester: 50 vol. %. Produced by thermal melting method. Unit weight 27 g/m², thickness 30 $\mu$m, fineness 3 d and average fiber length=5.1 cm. It was used in Example 31.

(13) Polypropylene non-woven fabric 6: Non-woven fabric made by a spunbond method. Unit weight 20 g/m², thickness 0.21 mm and fineness 2 d. Especially, this is prepared for a medical/sanitary use and is suitable for a non-woven fabric used for a disposable diaper, a medical/sanitary supply, a napkin and a cosmetic supply, etc. It was used in Example 32.

(14) Porous polyethylene film: Used for a filter medium. Product of super-high-molecular weight polyethylene (average molecular weight, over 5 millions), unit weight 30 g/m², thickness 0.060 mm, and an average diameter of voids is 1.0 μm. It was used in Example 24.

(15) Polypropylene synthetic paper: A film product which is white and contains a lot of air bubbles, unit weight 92 g/m² and thickness 0.13 mm. It was used in Example 25.

(16) Polyester film: A film of polyethylene terephthalate. Unit weight 72 g/m² and thickness 0.06 mm. It was used in Example 30.

(17) Carbon fiber: Source material is polyacrylonitrile fiber. Continuous filaments with average diameter of 1.4 μm. It was used in Example 26.

(18) Wool woven fabric: Unit weight 188 g/m² and thickness 0.5 mm. It was used in Example 27.

(19) Members of writing materials: A polypropylene-made ink collector, outside diameter 6–8 mm, inside diameter 2–4 mm, weight 0.61 g and length 28 mm. A polypropylene-made ink tank; outside diameter 10 mm, inside diameter 2–8 mm, weight 2.2 g and length 87 mm. They were used in Example 28.

(20) Battery separator made of glass fiber: Thickness 1.0 mm, unit weight 342 g/m², density 0.2 g/m³, fineness 10 μm, fiber length 4–8 cm, space volume ratio 93% and water absorption 780%. It was used in Comparative Example 7.

(21) Orthodontic brackets: Size 2.23×3.0×3.8 mm, weight about 31 mg, a polypropylene molded material reinforced with aluminium fitment. It was used in Example 33.

(B) Hydrophilic Polymer (1) Polyvinyl alcohol (PVA): A product of Wako Junyaku Co., Ltd., code number 160-11485 (degree of polymerization=1500–1800); used in Examples 1, 3, 4, 10, 11, 12, 13, 15, 17, 22, 23, 24, 25, 26, 27, 29, 30, 31, 32 and Comparative Examples 1 and 6.

(2) Sodium carboxymethylcellulose (CMC): A product of Wako Junyaku Co., Ltd., code number 039-01355; It was used in Examples 5, 6, 16, 28, 33 and Comparative Example 2.

(3) Starch: Potato starch (a product of Wako Junyaku Co., Ltd., code number 191-03985); It was used in Example 7.

(4) Agar: Agar powder (a product of Wako Junyaku Co., Ltd., bacterial culture medium use, code number 010-08725); It was used in Example 8.

(5) Aqueous silk sericin solution: Cocoons of Bombyx mori were boiled in an aqueous solution of 5% sodium carbonate. Fibroin was removed from the obtained mixture, and the obtained liquor was neutralized with a dilute HCl solution and the obtained solution was dialyzed in distilled water. The solution was concentrated to about a half of the original volume by air-drying. Thus, a solution of sericin with about 0.9 wt % was obtained. It was used in Example 2.

(6) Aqueous silk fibroin solution: Cocoons of Bombyx mori were washed in a boiling aqueous solution of 5% sodium carbonate. Fibroin removed from the obtained mixture was dissolved in a saturated aqueous solution of calcium chloride or lithium bromide by heating. The resulting solution was filtered and dialyzed in distilled water. The solution was concentrated to about ⅕ of the original volume by air-drying. Thus, a solution of fibroin with about 20 wt. % was obtained. It was used in Example 9.

(7) Gelatin: A product of Wako Junyaku Co., Ltd., code number 077-03155. It was used in Example 14.

(C) Reagents (1) Cerium ammonium nitrate (IV) (CAN): It was used in Examples 1, 8, 9, 16, 22, 23, 24, 25, 30 and 31.

(2) Potassium persulfate (KPS): It was used in Examples 2, 3, 6, 7, 10, 11, 12, 13, 14, 15, 17, 22, 23, 24, 25, 26, 27, 28, 30, 31, 32, 33 and Comparative Examples 1, 2, and 6.

(3) 2,2'-Azobisisobutylonitrile (AIBN): A product of Wako Junyaku Co., Ltd., code number 019-04932. It was used in Examples 28 and 29.

(4) Methanol: A product of Wako Junyaku Co., Ltd., code number 136-09475.

(5) Toluene: A product of Wako Junyaku Co., Ltd., code number 204-01866.

(D) Ozone Treatment

A specimen was put in a hard glass vessel of 2L volume (with an inlet and an outlet for gas) which was connected to an ozone generator (a product of Nippon Ozone Co., Ltd., ON-1-2 type). Then, ozone was generated by the ozone generator with an ozone yield of 1 g/hr and concentration of 20 g/m³, and a mixture of ozone and oxygen was introduced into the reaction vessel with a flow rate of 800 ml/min for 20–120 minutes. The concentration of ozone was checked by an iodine titration. The extent of oxidation of a specimen is checked by the infrared spectroscopy; the ratio of absorbance at 1710 cm$^{-1}$ to that at 973 cm$^{-1}$ was used.

(E) Plasma Treatment

A specimen (fabrics, films, etc.) was placed on a position between two electrodes in a reaction bath of a plasma generator (Yamato PR 500). After the pressure of the reaction bath was decreased to 0.27 Pa, a mixture of argon and oxygen (1:1 volume ratio) was introduced in the reaction bath until the pressure was increased to 5.6 Pa. A glow discharge was carried out mainly for 30 seconds to 3 minutes at an oscillation frequency of 13.56 MHz with a power supply of 40 W to 100 W. After the discharge, the introduction of a mixture of argon and nitrogen was stopped, the pressure was raised to a normal pressure and the treated specimen was taken out. The effect of the treatment was judged from a contact angle of water to films.

(F) Water-Absorption Test 1

A specimen was put in a beaker containing water, and it was stirred with a glass rod. Then, the specimen was taken out of the beaker and hung down until water drops were not found (for about 3 minutes). The increase in weight of a specimen (an amount of absorbed water) was estimated by the subtraction of a weight of the dried specimen from a weight of the water absorbed specimen. The percentage of a weight of absorbed water to the dried weight of the specimen gives "water absorption (%)".

Water absorption (%)=(weight of absorbed water/weight of dried specimen)×100

(G) Water-Absorption Test 2

A specimen was put in a beaker containing water, which had been set in a bath of an ultrasonic cleaner (an output power, 10W) and oscillated for 10 minutes. Then, the specimen was taken out of the beaker and hung down until water drops were not found (for about 3 minutes). Similarly to the above Test 1, a percentage of a weight of absorbed water to a weight of the dried specimen gives "water absorption (%)".

(H) Washing Fastness Test 1

A specimen was put in an aqueous solution of 0.1 wt % weak-alkaline soap, sodium aliphatic acid (a commercial name, Powder Soap of Lion Co., Ltd.) and the mixture was boiled for 5 minutes with stirring. This washing process was repeated a given times and the water absorption (%) was estimated at each time.

(I) Washing Fastness Test 2

A specimen was put in an aqueous solution of 0.4 wt % neutral detergent (a commercial name, Acron of Lion Co., Ltd.) and the mixture was boiled for 5 minutes with stirring at a liquor ratio of 1/250. This washing process was repeated several times and the water absorption (%) was examined at each time.

(J) Tensile Strength Test

Specimens were cut in rectangles (size, 15 mm×70 mm), and each part of 1 cm width from the edge of a specimen are clamped by cramps of a tensile tester (a SFV-55-0-20M of Imada Seisakusyo Co., Ltd.) and it was drawn at a rate of 20 mm/min. Each specimen was drawn along both a lengthwise direction and a cross direction of the original material. As a change in a strength along the lengthwise direction was seen in a similar range to that along the cross direction in each of the Examples, only the values along the lengthwise direction are given in Table 3 (where, the strength of the original material is defined as 1.0).

(K) Adhesion Strength

Rectangular specimens of 30 mm (along a lengthwise direction)×5 mm (a width) are cut from treated or untreated materials. An adhesion of 0.1 g is put on each part of 5 mm width from the edge of a specimen and the specimen was attached to a plywood board (thickness 2 mm and size 20 mm×10 mm). The specimen attached to the plywood board is clamped with polyethylene films and a 500 g weight is put on the surface of the film for 12 hours. Each part of 1 cm width from the edge of the specimen is clamped by the cramps of the tensile tester (Imada Seisakusyo Co., Ltd.; SFV-55-0-20M) and it is drawn at a rate of 30 mm/min to see peel strength of the bonded part. The adhesion strength of an untreated polypropylene film was measured similarly to that described above and it was defined as 1.0 and the relative value of each adhesion strength was estimated.

A polycyanoacrylate type adhesive (Aron-alpha, a product of Toa Gosei Co., Ltd.) and a polyvinyl acetate emulsion type adhesive (Wood-use bond, a product of Konishi Co., Ltd.) are employed.

(L) Retention of Electrolytic Solutions

A weight of a dried specimen (size 5 cm×5 cm) was defined as W1. A specimen was dipped into an aqueous potassium hydroxide solution (30 wt %) for 5 minutes. The specimen was taken out of the solution and is hung on for 3 minutes. The weight of the specimen W2 was measured when liquid drops were not seen. The following equation gives the absorption (%) of an alkali solution.

Electrolytic solution retention (%)=100×(W2−W1)/W1

(M) Alkali-Resistance at High Temperature

A weight of a dried specimen (size 5 cm×5 cm) was given as W 1. A specimen was dipped in an aqueous potassium hydroxide solution (30 wt %) for 96 hours at 60° C. The specimen was taken out of the solution and was spread and hung on for 3 minutes. The weight of the specimen W2 was measured when liquid drops are not seen. Then the specimen was washed with water and dried in vacuum, and the weight was represented as W3. The following equations give an absorption (%) of an electrolytic solution and a weight decrease (%).

Electrolytic solution absorption (%)=100×(W2−W1)/W1

Weight decrease (%)=100×(W1−W3)/W1

(N) Self Charge/discharge Test

An improved non-woven fabric was assembled in a scaled nickel-hydrogen battery of a coin-size (nominal capacity: 500 mAH). Three batteries were prepared in this way. When the property of the batteries seemed to be stable, they were charged to 120% by an electric source of 0.1 C (Coulomb). After four cycles of a charge-discharge process, an average value of a residual capacity for each battery was estimated at 45° C. after two weeks. The values are given in Table 3.

(O) Measurement of Contact Angle of Water

A contact angle measuring apparatus (a product of CA-X of Kyowa Kaimen Kagaku Co., Ltd.) was employed. A water drop of about 1 mm diameter was put on a surface of a specimen by an injector at 20 degree C, and the ware drop was enlarged by a video camera and the contact angle was estimated.

EXAMPLE 1

Hydrophilic Treatment of Polypropylene Non-woven Fabric by the Method of the Foregoing Aspect 1 of this Invention (with Polyvinyl Alcohol (PVA))

A polypropylene fabric 1 (0.3 g, size 50 mm×50 mm) was treated with ozone for 20 minutes. An IR spectrum of the ozone-treated fabric was observed and the ratio of the absorbance at around 1710 $cm^{-1}$ to that at around 973 $cm^{-1}$ was estimated as 0.08 by the base line method. Then, the ozone-treated fabric was put in a vessel containing 100 ml of water, 1 g of PVA, 10 mg of cerium ammonium nitrate (IV) (CAN) and 15 ml of methanol. The reaction mixture was set in a water bath at 50° C. for 2 hours. After the treatment, the fabric was washed with water and dried. Relation between values of water absorption (%) of the fabric and the number of washing fastness test is given in Table 1. The lowering of the hydrophilicity of the treated fabrics was very small.

EXAMPLE 2

Hydrophilic Treatment of Polypropylene Non-woven Fabric by the Method of Aspect 1 (with Silk Sericin)

A polypropylene fabric 1 (0.3 g) was treated with ozone for 30 minutes. Then, the ozone treated fabric was put in a vessel containing 100 ml of water, 10 mg of potassium persulfate, 3 ml of methanol and 5 ml of a silk sericin solution. The reaction mixture was maintained at 80° C. for 2 hours with stirring. After the treatment, the fabric was washed with water and examined by "Washing fastness test 2". The weight-change of the specimen after the hydrophilic treatment was not observed in the order of about 0.1 mg. As silk sericin was a protein, "Washing fastness test 2" using a neutral detergent was carried out. Relation between water absorption (%) of the fabric and the number of washing fastness test was given in Table 1. A considerable change in the hydrophilicity by the laundry was not seen. As far as the treated fabric is washed with a neutral detergent, the practical hydrophilicity can be maintained. Water absorption (%) was tested by "Water-absorption test 2".

EXAMPLE 3

Hydrophilic Treatment of Polypropylene Non-woven Fabric by the Method of Aspect 1 (with PVA)

A polypropylene fabric 1 (0.3 g) was treated with ozone for 30 minutes. Then, the ozone treated fabric was put in a vessel containing 100 ml of water, 30 mg of potassium persulfate, 0.3 g of PVA and 3 ml of methanol. The reaction mixture was maintained at 80° C. for 2 hours with stirring. After the treatment, the fabric was washed with water and examined by "Washing fastness test 1". The water absorption property on the fabrics examined by "Water-absorption test 1" were from 800% to 1100%. The weight-change of the specimen after the hydrophilic treatment was not observed in the order of about 0.1 mg. The results were given in Table 1. Even after six times of the washing fastness test 1, the water absorption property of the treated fabric was kept over 810%.

EXAMPLE 4
Hydrophilic Treatment of Polypropylene Non-woven Fabric by the Method of Aspect 1 (with PVA)

A polypropylene non-woven fabric 3 (0.3 g) treated with ozone for 30 minutes was put in a vessel containing 100 ml of water, 0.3 g of PVA and 3 ml of methanol. The reaction mixture was maintained at 80° C. for 2 hours with stirring. After the treatment, the fabric was washed with water and examined by "Water-absorption test 1". The water absorption property on the fabrics examined by three times of "Water-absorption test 1" was 650%. The results are given in Table 1. Even after six times of the washing fastness test 1, the water absorption property of the treated fabric was kept over 650%.

Comparative Example 1
Hydrophilic Treatment of Polypropylene Non-woven Fabric Using Potassium Persulfate and PVA A polypropylene fabric 3 (0.3 g) with no ozone-treatment was put in a vessel containing 100 ml of water, 30 mg of potassium persulfate, 0.3 g of PVA and 3 ml of methanol. The reaction mixture was maintained at 80° C. for 2 hours with stirring. After the treatment, the fabric was washed with water and "Washing fastness test 1" was carried out. The water absorption of the treated fabric by "Absorption test 1" gave 760%. The water absorption decreased to 260% after six times of the washing fastness test. The results are given in Table 1. The weight of the specimen after the hydrophilic treatment was 4 weight % of the original weight. Thus, when the activation step was not carried out, the water absorption property of the treated specimen was markedly decreased.

EXAMPLE 5
Hydrophilic Treatment of Polypropylene Non-woven Fabric by the Method of Aspect 1 (with CMC in the Absence of Initiators)

A polypropylene fabric 3 (0.3 g) was ozone-treated for 30 minutes and was put in a vessel containing 100 ml of water, 0.3 g of CMC and 3 ml of methanol. The reaction mixture was maintained at 80° C. for 2 hours with stirring. After the treatment, the fabric was washed with water. After three times of "Washing fastness test 1", the water absorption of the treated fabric was 580%. The results are given in Table 1.

EXAMPLE 6
Hydrophilic Treatment of Polypropylene Non-woven Fabrics by the Method of Aspect 1 (with CMC)

A polypropylene fabric 3 (1.0 g) ozone-treated for 30 minutes was put in a vessel containing 200 ml of water, 0.5 g of CMC, 3 ml of methanol and 50 mg of potassium persulfate. The reaction mixture was maintained at 80° C. for 1 hour with stirring. After the treatment, the fabric was washed with water and "Washing fastness test 1" was carried out. After three times of the washing fastness test, the water absorption was 773%. The results are given in Table 1.

Comparative Example 2
Hydrophilic Treatment of Polypropylene Fabric without the Activation Treatment A polypropylene fabric 3 (1.0 g) with no activation treatment was put in a vessel containing 200 ml of water, 0.5 g of CMC, 50 mg of potassium persulfate and 3 ml of methanol. The reaction mixture was maintained at 75° C. for one hour with stirring. After the treatment, the fabric was washed with water and "Washing fastness test 1" was carried out. The water absorption was 630% after the first washing fastness test. The results are given in Table 1. After three times of the washing fastness test 1, the water absorption is decreased to 250%.

EXAMPLE 7
Hydrophilic Treatment of Polypropylene Non-woven Fabric by the Method of Aspect 1 (with Starch)

A polypropylene non-woven fabric 2 (1.0 g) treated with ozone for 30 minutes was put in a vessel, and 100 ml of water and 1.0 g of potato starch were put in the vessel. After the starch was dissolved by heating, 50 mg of potassium persulfate and 3 ml of methanol were added in the reaction mixture. The reaction mixture was maintained at 60° C. for 1 hour with stirring. Then, the fabric was washed with water and "washing fastness test 1" was carried out. The water absorption of the treated fabric estimated by "Water absorption test 1" was 600%. After three times of the washing fastness test 1, the water absorption of the treated fabric was 530%. The results are given in Table 1.

EXAMPLE 8
Hydrophilic Treatment of Polypropylene Non-woven Fabric by the Method of Aspect 1 (with Agar Powder)

A polypropylene non-woven fabric 1 (1.0 g) was plasma-treated for 30 seconds at a power supply of 60V and it was put in a vessel. A 100 ml of water and 1.0 g of agar powder were put in the vessel, and they were dissolved by heating. Then, 60 mg of cerium ammonium nitrate (IV) and 3 ml of methanol were added in the mixture. The reaction mixture was maintained at 60° C. for 1 hour with stirring. After the treatment, the fabric was washed with water. The water absorption of the treated fabric estimated by "Water absorption test 1" was 595%. After two times of "Washing fastness test 1", the water absorption of the treated fabric was 410%. The results are given in Table 1.

EXAMPLE 9
Hydrophilic Treatment of Polypropylene Non-woven Fabric by the Method of Aspect 1 (with Silk Fibroin)

A polypropylene non-woven fabric 1 (0.5 g) treated with ozone for 30 minutes was put in a vessel. Then, 100 ml of water, 60 mg of cerium ammonium nitrate (IV), 3 ml of methanol and 3 ml of a silk fibroin solution (concentration: 20 wt %) were added in the vessel. The reaction mixture was maintained at 60° C. for 2 hours with stirring. After the treatment, the fabric was washed with water. After two times of "Washing fastness test 2" with a neutral detergent, the water absorption of the specimen was 510%. The results are given in Table 1. The change in the weight of specimen after the hydrophilic treatment was not observed in the range of about 0.1 mg.

EXAMPLE 10
Hydrophilic Treatment of a Polypropylene-polyethylene Conjugated Fiber-made Non-woven Fabric by the Method of Aspect 1 (with PVA)

A non-woven fabric of polypropylene-polyethylene conjugated fiber (1.0 g) was ozone-treated for 30 minutes. Then, the fabric was put in a vessel, and 100 ml of water, 1.0 g of PVA, 60 mg of potassium persulfate and 3 ml of methanol were added in the vessel. The reaction mixture was maintained at 60° C. for 2 hours with stirring. After the treatment, the fabric was washed with water and "Washing fastness test 1" was carried out. The water absorption of the treated fabric estimated by "Water absorption test 1" was 1000%. The weight change of a specimen after the hydrophilic treatment was not observed in the range of about 0.1 mg. After five times of the washing fastness test 1, the water absorption of the treated fabric was 850%. The results are given in Table 1.

EXAMPLE 11
Hydrophilic Treatment of Polyethylene Terephthalate Non-woven Fabric by the Method of Aspect 1 (with PVA)

A polyethylene terephthalate non-woven fabric (0.8 g) was ozone-treated for 30 minutes. Then, the fabric was put in a vessel, and 40 mg of potassium persulfate, 100 ml of water, 0.5 g of PVA and 5 ml of methanol were added in it. The reaction vessel was changed to be under nitrogen atmosphere. The reaction mixture was maintained at 70° C. for 2 hours with stirring. After the treatment, the fabric was washed with water. The water absorption of the treated fabric estimated by "Water absorption test 1" was 1200%. After five times of the washing fastness test 1, the water absorption of the treated fabric was 860%. The increase in the weight of specimen after the hydrophilic treatment was 0.5%. The results are given in Table 1.

TABLE 1

Water absorption (%) of treated non-woven fabrics after washing fastness test

| Examples | Number of washing fastness test ||||||
|---|---|---|---|---|---|---|
| | 1 | 2 | 3 | 4 | 5 | 6 |
| Example 1 | 1060 | 950 | 820 | 800 | 780 | 780 |
| Example 2 | 650 | 620 | 615 | 610 | | |
| Example 3 | 1080 | 930 | 830 | 820 | 810 | 810 |
| Example 4 | 820 | 730 | 650 | | | 650 |
| Example 5 | 679 | 640 | 580 | | | |
| Example 6 | 790 | 773 | 773 | | | |
| Example 7 | 600 | | 530 | | | |
| Example 8 | 595 | 410 | | | | |
| Example 9 | 640 | 510 | | | | |
| Example 10 | 1000 | | | | 850 | |
| Example 11 | 1200 | | | | 860 | |
| Comparative Example 1 | 760 | 460 | 330 | 320 | 300 | 260 |
| Comparative Example 2 | 630 | 350 | 250 | | | |

Unit: %:

EXAMPLE 12
Hydrophilic Treatment of Polypropylene Plain Cloth by the Method of Aspect 1 (with PVA)

A polypropylene plain cloth (1.88 g) was ozone-treated for 30 minutes, and the treated cloth was put in a vessel. Then, 200 ml of water, 1.61 g of PVA, 60 mg of potassium persulfate and 10 ml of methanol were added in it. The reaction mixture was maintained at 80° C. for 2 hours with stirring. After the treatment, the cloth was washed with water and dried. The water absorption of the treated fabric estimated by "Water absorption test 1" was 93.0%. After two times of "Washing fastness test 1", the water absorption of the treated fabric was 81.2%.

Comparative Example 3

A water absorption of an untreated polypropylene plain cloth examined by "Water absorption test 1" was 30%.

Comparative Example 4

A water absorption of a cotton plain cloth examined by "Water absorption test 1" was 108%.

EXAMPLE 13
Hydrophilic Treatment of Polyethylene Film by the Method of Aspect 1 (with PVA)

A polyethylene film (0.5 g) washed well with methanol was ozone-treated for 60 minutes. The film was put in a vessel, and 100 ml of water, 40 mg of potassium persulfate, 0.2 g of PVA and 3 ml of methanol were added in it. The reaction mixture was maintained at 70° C. for 2 hours with stirring. After the treatment, the film was washed with water and "Washing fastness test 1" was carried out. The water absorption of the treated film estimated by "Water absorption test 1" was 80%. The weight increase of the specimen after the hydrophilic treatment was 0.2%.

EXAMPLE 14
Hydrophilic Treatment of Polypropylene Film by the Method of Aspect 1 (with gelatin)

A polyethylene film (0.3 g) washed well with methanol was ozone-treated for 90 minutes. The film was put in a vessel, and 100 ml of water, 3 ml of methanol, 40 mg of potassium persulfate and 0.2 g of gelatin were added in it. The reaction mixture was maintained at 80° C. for 2 hours with stirring. After the treatment, the film was washed with water and "Washing fastness test 1" was carried out. The water absorption of the treated film examined by "Water absorption test 1" was 85%. The weight increase of the specimen after the hydrophilic treatment was 0.3%.

EXAMPLE 15
Hydrophilic Treatment of Polypropylene Film by the Method of Aspect 1 (with PVA)

A polyethylene film (0.3 g) washed well with methanol was plasma-treated for 60 seconds at a power supply 60V. The treated film was put in a vessel and 100 ml of water, 3 ml of methanol, 40 mg of potassium persulfate and 0.2 g of PVA were added in it. The reaction mixture was maintained at 80° C. for 2 hours with stirring. After the treatment, the film was washed with water and "Washing fastness test 1" was carried out. The water absorption of the treated film examined by "Water absorption test 1" was 75%. The weight increase of the specimen after the hydrophilic treatment was 0.2%.

EXAMPLE 16
Hydrophilic Treatment of Polypropylene Film by the Method of Aspect 1 (with CMC)

A polypropylene film (0.3 g) washed well with methanol. Then, it was ozone-treated for 90 minutes. Then the treated film was put in a vessel, and 100 ml of water, 3 ml of methanol, 40 mg of CAN and 0.2 g of CMC were added in it. The reaction mixture was maintained at 80° C. for 2 hours with stirring. After the treatment, the film was washed with water and "Washing fastness test 1" was carried out. The water absorption of the treated film (examined by "Water absorption test 1) was 57%. The weight increase of the specimen after the hydrophilic treatment was 0.2%.

Adhesion Test

Water absorption (%) examined by "Water absorption test 1" and, relative adhesion strength for the specimens obtained in Examples 14, 15, 16 and untreated films are summarized in Table 2. The values of adhesion strength were given as relative values when each of the adhesion strength for untreated film with polycyano acrylate adhesion or polyvinyl acetate-system adhesive is defined as 1.0. It was seen that the adhesion strength of the treated film was increased by the present hydrophilic treatment.

In addition, a contact angle of water to an untreated polypropylene was 116° (this is applied similarly as below), and that of the specimen of Example 15 was 49.7°; the improvement of hydrophilicity was ascertained.

TABLE 2

| Examples | Water absorption (%) | Relative adhesion strength | |
|---|---|---|---|
| | | Polycyano acrylate | Polyvinyl acetate system |
| Example 14 | 85 | 1.75 | 1.52 |
| Example 15 | 75 | 2.40 | 1.85 |
| Example 16 | 57 | 1.68 | 1.55 |
| Untreated specimen | 14 | 1.00 | 1.00 |

Comparative Example 5
Ozone-treatment of Polypropylene Films

A polypropylene film (0.3 g) was washed well with methanol, and then it was ozone-treated for 30 minutes. The water absorption of the treated film estimated by "Water absorption test 1" was 12% (that of untreated film was 2.5%; this is applied similarly as below). The contact angle of water was 99.3°. The weight increase of the specimen after the treatment was 0.1%.

EXAMPLE 17
Hydrophilic Treatment of Polypropylene Film by the Method of Aspect 3

Polypropylene film (0.4 g) was washed well with methanol, and it was immersed in toluene for 1 minutes at 50° C. (liquor ratio 1:10). Then, it was ozone-treated for 30 minutes. The ozone-treated film was put in a vessel, and 100 ml of water, 40 mg of potassium persulfate, 0.2 g of PVA and 3 ml of methanol were added in it. The reaction mixture was maintained at 80° C. for 2 hours with stirring. After the treatment, the film was washed with water and "Washing fastness test 1" was carried out. A water absorption of the treated film estimated by "Water absorption test 1" was 52%. A contact angle of water was 83°. A weight increase of the specimen after the treatment was 0.2%.

Comparative Example 6
Treatment of Polypropylene Film without an Activation Treatment Polypropylene film (0.4 g) was washed well with methanol, and it was immersed in toluene for 1 minute at 50° C. (liquor ratio 1:10). Then, it was put in a vessel, and 100 ml of water, 20 mg of potassium persulfate, 0.2 g of PVA and 3 ml of methanol were added in it. The reaction mixture was maintained at 80° C. for 2 hours with stirring. The water absorption of the treated film estimated by "Water absorption test 1" was 17%. A contact angle of water was 86°. A weight increase of the specimen after the treatment was 0.2%.

Thus, as described in Example 17, the polypropylene film obtained by the present invention gives a more higher hydrophilicity as compared with that obtained without the ozone treatment.

EXAMPLE 18
Alkali Battery Separators

When a polymeric material with an improved hydrophilicity is used for alkali battery separators, it should have excellent properties in a retention of an electrolytic solution, a durability to alkalis and a charge/discharge property. The values in Examples 1, 3, 4 and 6 and Comparative example 1 are given in Table 3.

TABLE 3

| Examples | Water absorption (%) after 6 times' washing fastness tests | Relative tensile strength (Before treatment = 1) | Retention of electrolytic solution (%) | Alkali-resistance (Decrease in weight (%)) | Capacity after self-discharge (%) |
|---|---|---|---|---|---|
| Example 1 | 780 | 0.87 | 750 | 0.1 | 85 |
| Example 3 | 810 | 0.85 | 760 | 0.1 | 85 |
| Example 4 | 680 | 0.92 | 480 | 0.2 | 82 |
| Example 6 | 750 | 0.79 | 540 | 0.0 | 90 |
| Comparative Example 1 | 260 | 0.91 | 260 | 3.0 | 65 |

As shown in Table 3, polypropylene non-woven fabrics (Examples 1, 3 and 6) which were treated by the ozone-treatment and the polymer treatment with PVA or CMC in the presence of an initiator (cerium ammonium nitrate (IV) or persulfates) gave the durability in an alkali-resistance property and a water absorption property. They are suitable for alkali battery separators. A polyolefin non-woven fabric prepared by the ozone treatment and the treatment with PVA in the absence of an initiator (Example 4) is also suitable for alkali battery separators as they give an excellent alkali-resistance property and a durable hydrophilicity. On the other hand, a polyolefin non-woven fabric prepared by the treatment with PVA and an initiator without the ozone treatment (Comparative example 1) gave a decrease in a water absorption property after the washing fastness tests, a low retention property of an electrolytic solution and a decrease in a battery content after a self-discharge process as compared with Examples 1, 3, 4 and 6.

EXAMPLE 19
Application as a Microbial Culture Medium

Each of improved non-woven fabrics treated similarly to Examples 1 to 8 was cut in two pieces of a size of 2 cm×2 cm, and they were aligned in a petri dish of diameter 8 cm and depth 2 cm without an overlapping.

A bouillon/agar solution 100 ml was prepared by dissolving meat extract (1 wt %), polypeptone (1 wt %), sodium chloride (0.5 wt %) and agar (0.5 wt %) in water. The agar in the mixture was dissolved by using a microwave oven, and a bouillon/agar solution 50 ml was infiltrated through said non-woven fabrics prepared by the present invention. Then, the mixture was cooled down to the room temperature. The non-woven fabrics containing the bouillon/agar solution were put in the test tubes, which had been autoclaved for 15 minutes at 120° C. These test tubes were allowed to stand at 37° C. overnight. The following day, after confirming the asepsis, microbes (Escherichia coli K-12 strain, Salmonella Typhimurium LT-2 strain and Bacillus subtilis Marburg strain, etc.) were planted on the fabrics, and they were cultivated overnight at 30 to 37° C. A microscopic observation showed that each of the microbes was growing well.

EXAMPLE 20
Materials for Cleansing/wiping

Improved non-woven fabrics obtained by the Aspect 1 similarly to Examples 10 and 11 were cut into a fabric of 30 cm×30 cm size. After being absorbed by water, the fabric were used to clean a wooden table of 1.2 m×1.2 m size for 1 minute, and the fabric was rinsed with water and dried. When this manner was repeated 10 times, the water absorption property of the fabric was observed; a considerable decrease in the water absorption property was not seen and the tensile strength gave a decrease of 20% of the original value.

EXAMPLE 21
Water Retention Materials for Plants

A non-woven fabric prepared similarly to Example 3 was put in a plant pot containing mud and water. The water absorption amount was 1200 g per fabric of 100 g. When this plant pot containing the non-woven fabric absorbed water was covered with a polyethylene film, it did not need a water supply for a week.

EXAMPLE 22
Polypropylene Film Treated by the Method of Aspect 2

Polypropylene film (0.4 g) was washed well with methanol, and dried. The film was then treated with ozone for 90 minutes. Then, the treated film was put in a vessel, and 3 ml of methanol, 100 ml of water, 20 mg of potassium persulfate and 0.2 g of PVA were added in it. The reaction mixture was maintained at 80° C. for 2 hours with stirring. After the treatment, the specimen was washed with water for 5 minutes at 60° C. Then, the treated film was put in a vessel, and 10 mg of cerium ammonium nitrate (IV) and 0.2 ml of acrylic acid were added in it. The reaction mixture was maintained at 80° C. for 2 hours with stirring. The water absorption of the treated film examined by "Water absorption test 1" was 17%. A contact angle of water was 86°. A weight increase of the specimen by the treatment was 0.2%.

EXAMPLE 23
Polypropylene Non-woven Fabric Treated by the Method of Aspect 2, and Its Use for Lead Storage Battery Separators A polyethylene non-woven fabric 4 (63.9 g, size 77 mm (width)×5.5 mm (length)×1 mm (thickness)) was ozone-treated for 45 minutes.

Then, the treated fabric was put in a cylindrical reaction vessel, and 40 ml of methanol, 500 ml of water, 10 g of PVA and 400 mg of potassium persulfate were added in it. The reaction mixture was maintained at 80° C. for 2 hours with stirring. After this step, the specimen was washed with boiling water for three minutes. Then, the obtained specimen was put in a cylindrical reaction vessel, and 500 ml of water, 400 mg of cerium ammonium nitrate (IV) and 20 ml of acrylic acid were added in it. The reaction mixture was maintained at 80° C. for 2 hours with stirring. The treated non-woven fabric was washed with an aqueous soup solution (conc. 0.1 wt %, liquor ratio=1/20) at 60° C., and rinsed well in water and dried. The grafting was 2%. Its retention property of an electrolytic solution (40 wt % sulfuric acid solution) was 650%. When the relative tensile strength of an untreated fabric was defined as 1.0, the relative tensile strength of the treated fabric was 0.94.

Alkali-resistance test: The obtained specimen was dipped in an aqueous potassium hydroxide solution (40 wt %) at 70° C. for a week. Then, the specimen was sufficiently washed with water and dried. Its retention property of an electrolytic solution (40 wt % of sodium hydroxide) was 650%, and the relative tensile strength was 0.94.

Sulfuric acid-resistance test: The obtained specimen was dipped in an aqueous sulfuric acid solution (40 wt %) at 70° C. for a week. The specimen was sufficiently washed with water and dried. The retention property of the specimen to the electrolytic solution (a retention % of the sulfuric acid solution) was 660%, and the relative tensile strength was 0.94.

Oxidant-resistance test: The obtained specimen was dipped in an aqueous hydrogen peroxide solution (concentration, 20 weight %) for one week at 30° C. The specimen was sufficiently washed with water and dried. The retention property of the obtained specimen to the electrolytic solution (a retention % of the sulfuric acid solution) was 600%, and the relative tensile strength was 0.94.

Electric property test: Hydrophilic polypropylene non-woven fabrics prepared by the present invention or glass fiber separators (Comparative example 7) which are extensively used for the separators in sealed-type lead storage batteries were assembled in sealed-type lead storage batteries. The batteries gave a voltage 4 V and a capacity 3.8 Ah. A discharge test was carried out and the time when the final voltage gave 2.8 V at a discharge current of 13 A was observed. The results of the electric property after a charge-discharge test are given in Table 4.

From these results, it is found out that a separator for a lead storage battery using an excellent retention property of an electrolytic solution, a long-life and a light weight can be produced inexpensively.

Comparative Example 7
Glass Fiber Separators

For comparison of battery properties, a glass fiber separator which was extensively used for a separator in a sealed-type lead storage battery was examined. The glass fiber separator is known to contain surfactants for water absorption. The retention property of an electrolytic solution was 560%. The results for the batteries using each of separators are given in Table 4.

TABLE 4

| Items | Example 23 | Comparative example 7 |
|---|---|---|
| Materials | Hydrophilic polypropylene non-woven fabric | Glass fiber with acid resistance |
| Electric resistance (ohm dm$^3$/one piece) | 0.0003 | 0.0040 |
| Discharge time after 30 times of charge/discharge (sec) | 750 | 700 |
| Discharge time after 100 times of charge/discharge (sec) | 640 | 500 |
| Voltage after self discharging (V) | 4.0 | 3.7 |
| Initial water absorption rate (cm/min) | 5.0 | 4.0 |
| Water absorption rate after 6 months (cm/min) | 5.0 | 3.5 |

TABLE 4-continued

| Items | Example 23 | Comparative example 7 |
|---|---|---|
| Initial retention property of electrolytic solution (%) | 650 | 560 |
| Retention property of electrolytic solution after 6 months (%) | 650 | 480 |

These results suggest that the lead storage battery using a hydrophilic polyolefin non-woven fabric prepared by the present invention gives an excellent retention property of an electrolytic solution, a long lifetime and a lightweight. They can be produced with a cheaper price as compared with the batteries prepared by the usual techniques.

EXAMPLE 24
Hydrophilic Treatment of Porous Polyethylene Film by the Method of Aspect 4 and Its Application A porous polyethylene film of A4 size was washed with methanol and dried. Then, it was immersed in 100 ml of toluene at 50° C. for 5 minutes. After wiping the toluene on the film, it was ozone-treated for 60 minutes. The ozone-treated film was put in a vessel, and 400 ml of water, 100 mg of potassium persulfate, 5 g of PVA and 3 ml of methanol were added in it. The reaction mixture was maintained at 80° C. for 2 hours with stirring. After the treatment, the film was washed with an aqueous soap solution at 60° C. three times (500 ml water for each washing).

Then, the treated film was put in a vessel, and 400 ml of water, 100 mg of cerium ammonium nitrate (IV) and 5 ml of acrylic acid were added in it. The reaction mixture was maintained at 80° C. for 2 hours with stirring under nitrogen atmosphere. The treated film was washed with an aqueous soap solution at 60° C. and washed well with water. The water absorption of the treated film estimated by "Water absorption test 1" was 200% (an untreated porous polyethylene film gave 5%). A contact angle of water could not measured because water was absorbed by the treated film (a untreated porous polyethylene film gives 120°). A weight increase of the specimen after the treatment was 2%. This hydrophilic porous polyethylene film gives excellent properties in an alkali-resistance and an acid-resistance, and it is available for a filtration of water.

EXAMPLE 25
Hydrophilic Treatment of Polypropylene Synthetic Paper by the Method of Aspect 4

Polypropylene synthetic papers were treated by the method similar to Example 24 and the hydrophilic property was improved. The treated synthetic papers are possible to be written with water-soluble ink and they could be bonded to papers with water-soluble glues (starch, CMC and PVA, etc.).

EXAMPLE 26
Hydrophilic Treatment of Carbon Fibers by the Method of Aspect 4 and Its Application for Composites Carbon fiber 6.0 g was washed with methanol, dried and ozone-treated for 30 minutes. Then, it was put in a vessel containing 100 ml of an aqueous PVA solution (containing 2 g of PVA) and 100 mg of potassium persulfate was added in it.

The reaction mixture was maintained at 80° C. for 2 hours with stirring. After the treatment, the fiber was washed with an aqueous soap solution (concentration 0.1 wt % and liquor ratio 1/1000). After drying, the water absorption increased to be 200% (untreated fiber gave 120%). When the treated fiber was put on a surface of water, it sank in 3 seconds. But an untreated fiber did not sink in water even after one hour. The treated carbon fiber was mixed with an epoxy resin adhesive and the mixture was dried. As a result, a rod of 5 mm×5 mm×100 mm size made of a composite of epoxy resin and hydrophilically-treated carbon fiber was obtained. As a comparison, a rod with the same size as the above specimen was prepared with epoxy resin and untreated carbon fiber. The tensile strength of the rod containing hydrophilically-treated carbon fiber was five times of that of a rod containing untreated carbon fiber.

EXAMPLE 27
Hydrophilic Treatment of Wool Fiber by the Method of Aspect 1

Wool fiber (6.0 g) was washed with methanol, dried and ozone-treated for 60 minutes. Then, it was put in 15 ml of an aqueous PVA solution (containing 0.375 g of PVA) in a vessel and 50 mg of potassium persulfate was added in it. The reaction mixture was maintained at 80° C. for 2 hour with stirring. After the treatment, the fiber was washed twice with an aqueous solution of a neutral detergent (concentration 0.1 wt % and liquor ratio 1/1000). After drying, the water absorption increased to be 380%. An untreated fiber gave 99%.

When water drops were put on an untreated wool fiber cloth and the cloth was inclined, they fell down. On the other hand, water drops were put on the surface of the improved hydrophilic wool cloth, they were absorbed in 30 sec.

EXAMPLE 28
Hydrophilic Treatment of Writing Material Members Made of Polypropylene of Aspect 4

The solvent treatment of five ink collectors and five ink tanks which are made of polypropylene was carried out; they were dipped in toluene at 40° C. for 5 minutes. Then, they were ozone-treated for 1 hour. Then, the treated specimens were put in a mixture of 50 mg of potassium persulfate, 200 ml of water and 0.1 g of CMC at 80° C. for 2 hours. Then, the specimens, 60 ml of water, 0.7 ml of acrylic acid and 50 mg of AIBN were put in a Pyrex glass vessel, which was covered. The UV light of a high pressure mercury lamp (Toshiba H400P lamp) was irradiated to the reaction vessel at 30° C. for 2 hours; the distance between the vessel and the UV light was 20 cm. The ink collectors and tanks were taken out of the reaction mixture and washed with a soap solution for 10 minutes at 60° C. (concentration=0.1 wt % and a liquor ratio=1/500), washed with water and dried. The hydrophilic materials were obtained. The hydrophilic materials were soaked well when they were dipped in water. A water-soluble ink was put into the treated ink tank, the ink involved in the tank did not easily pour out of it. On the other hand, untreated ink collectors and ink tanks did not absorb water. When water-soluble ink was put in them, it did not wet their surface.

EXAMPLE 29
Hydrophilic Treatment of Polypropylene Non-woven Fabric by the Method of Aspect 4

A polypropylene non-woven fabric 5 (0.5 g) was washed with methanol and dried. Then, it was dipped in 100 ml of toluene for 5 minutes at 50° C. After wiping toluene on the surface of the fabric, it was treated with ozone for 45 minutes. The treated fabric was put in a vessel and 100 ml of water, 10 mg of AIBN, 0.5 g of PVA and 5 ml of methanol were added in it. The reaction mixture was maintained at 80°

C. for 1 hour. After the treatment, the fabric was washed with a soap solution at 60° C. (concentration 0.1 wt % and a liquor ratio 1/1000).

Then, the treated fabric was put in a Pyrex-glass vessel which contained a solution made of 30 ml of methanol, 10 mg of AIBN, 30 ml of water and 0.3 ml of acrylic acid. The UV light of a high pressure mercury lamp (Toshiba H400P lamp) was irradiated to the reaction vessel at 30° C. for 90 minutes; the distance between the vessel and the UV light was 20 cm. The treated fabric was washed with a soap solution at 60° C. for 10 minutes, washed with water and dried. The water absorption property of the obtained material and the water absorption rate, were 200% and 5.2 cm/min., respectively (an untreated fabric: 20% and 0 cm/min.). Thus, as the obtained material gave durability in the water absorption property and excellent properties in alkali-resistance, acid-resistance and an anti-oxidation, it was suitable for a battery separator.

EXAMPLE 30
Hydrophilic Treatment of Polyester Film by the Method of Aspect 4

Polyester film (10 g) was dipped in 100 ml of toluene at 50° C. for 10 minutes. When the surface of the film seemed to be dried apparently, the weight increase of the film was about 2%. Then, it was treated with ozone for 30 minutes. The ozone-treated film was put in an Erlenmeyer flask, and 5 ml of methanol, 100 ml of water, 0.5 g of PVA and 0.1 g of potassium persulfate were put in the flask. The reaction mixture was maintained at 80° C. for 2 hours with stirring. After the treatment, the film was washed well with water at 60° C. Then, the film was put in a reaction vessel, and 5 ml of methanol, 400 ml of water, 100 mg of cerium ammonium nitrate (IV) and 5 ml of acrylic acid were put in it. The vessel was set under nitrogen atmosphere and maintained at 80° C. for 2 hours. Then, the treated film was washed with a soup solution three times at 60° C. (concentration=0.1 wt % and a liquor ratio=1/100). After drying, the treated film gave a contact angle of water, 22° (a untreated film gave 71°). The improved film gave durability in a hydrophilic property, and was soaked almost completely with water. When the improved film was stuck to a glass mirror with an adhesive, the miller gave an anti-fog property. The improved film could be bonded to various materials with usual adhesives.

EXAMPLE 31
Hydrophilic Treatment of Non-woven Fabric of Polyethylene/polyester Conjugated Sheath-core Type Fiber by the Method of Aspect 4 and Its Application for Cleaning Wiper A non-woven fabric of polyethylene/polyester sheath-core type conjugated fiber (2.4 g) was immersed in 100 ml of toluene for 2 minutes at room temperature. Then, the fabric was taken out of toluene and it was squeezed by a centrifugal separator (a rotation number, 1000 rpm) until the extent that the surface looked dry apparently. The weight increase by this solvent treatment was about 4%. Then, it was treated with ozone for 30 minutes. Then, the ozone-treated non-woven fabric was put in an Erlenmeyer flask, and 5 ml of methanol, 100 ml of water, 0.5 g of PVA and 0.1 g of potassium persulfate were put in the flask. The flask was set at 80° C. for 2 hours under nitrogen atmosphere. After the treatment, the fabric was washed well with water. The obtained fabric was squeezed (to the extent of water absorption, 300%).

Then, the obtained fabric was put in a vessel, and 40 ml of water, 100 mg of cerium ammonium nitrate (IV) and 5 ml of acrylic acid were added in it. The flask was set under nitrogen atmosphere and maintained at 80° C. for 2 hours. After the treatment, the fabric was washed with an aqueous soap solution at 60° C. three times (concentration 0.1 wt % and a liquor ratio 1:500). After drying, the water absorption of the non-woven treated fabric examined by "Water absorption test 1" was 2310%. That of an untreated non-woven fabric was 350%. The weight increase of the specimen after the hydrophilic treatment was 4%. The water absorption property of the material prepared by the Aspect 4 is higher than that by the Aspect 1 (the treatment by the Aspect 1 gave a water absorption of about 1400%) and it gave a large water absorption rate and a durable water absorption property. The improved non-woven fabric is preferably available for a wiper for cleansing/wiping (a substitute for scrubbing cloth). Ten sheets of the hydrophilic fabric which was absorbing water (a water absorption, about 2000%) were superposed and they were equipped to a cleaning mop. The mop was used for cleaning a wooden floor. After the use, they were rinsed with water and used repeatedly. They could be used over ten times.

EXAMPLE 32
Hydrophilic Treatment of Polypropylene Non-woven Fabric 6 by the Method of Aspect 1 and an Application for Disposable Sanitary Supplies A polypropylene fabric 6 was treated with ozone for 30 minutes. Then, the ozone-treated specimen was put in a vessel, and 500 ml of water, 300 mg of potassium persulfate, 5.0 g of PVA and 50 ml of methanol were put in it. The reaction mixture was maintained at 80° C. for 2 hours with stirring. After the treatment, the fabric was washed with water at room temperature and washed with water of 60° C. three times (2000 ml of water was used for each washing). The water absorption of the treated material examined by "Water absorption test 1" was 800 to 1100%.

A model of disposable diaper was prepared as follows: the hydrophilic polyolefin non-woven fabrics prepared as above was used for an inside cloth, an untreated hydrophobic polyolefin non-woven fabric was used for the outside cloth, and a water retention agent (water-absorption polymers; starch or polyacrylic acid and their derivatives, etc.) was used as a core material. Namely, an untreated hydrophobic polypropylene non-woven fabric was put on the bottom, and a water retention polymer was put on it, and the hydrophilic polyolefin non-woven fabric of the present invention was put on the top. When a cup of water was poured on the diaper model, water was penetrated quickly through the hydrophilic polyolefin non-woven fabric and absorbed by the water retention agent. Thus, the non-woven fabric improved in the water absorption property prepared by the present invention is available for the material for disposable diapers and sanitary/physiology supplies.

EXAMPLE 33
Improvement of Adhesion Property of Orthodontic Brackets 20 orthodontic brackets (0.622 g) were treated by the method of Aspect 4 similarly to Example 28. The treated brackets gave a good adhesion property to ceramic materials for teeth with adhesives for teeth.

Industrial Applicability

As mentioned above, various polymeric materials improved by the present invention gave an excellent water absorption property and a good adhesion property with adhesives. In addition, battery separators prepared with the polyolefin non-woven fabric improved by the present invention gave a high tensile strength, a high electrolytic solution retention, and excellent alkali resistance and acid resistance. Thus, the battery separators of the present invention can be used for alkali batteries and acid batteries as excellent separators which gave no change in the battery performance.

In addition, the polyolefin filter medium improved in hydrophilicity is useful for the filtration of aqueous solutions. The improved material by the present invention gives a water absorption property and an excellent adhesion property to synthetic papers; the improvement of printing property is also expected. As the adhesion property of many kinds of polymeric materials containing carbon fiber is extremely improved, hydrophilic materials available for reinforcing fibers for composite materials can be obtained by the present invention. The hydrophilic property of the other many kinds of polymeric materials is also improved by the present invention. The absorption property of water-soluble ink by polyolefin-made members of writing materials which was impossible so far is also improved.

As the water absorption property can be given to polyolefins, polyesters and composite fibers, etc. by the present invention, the improved materials can be used in various kinds of a medical/sanitary/cosmetic supplies and a textile product for clothing. When hydrophobic polymer films are changed to be hydrophilic ones, the adhesion property to the other materials is extremely improved. When a film with water absorption property is stuck to a glass, the glass gives an anti-fog property. In addition, when a material for goggles is directly improved to be hydrophilic, it gives an anti-fog property. When the adhesion property of orthodontic brackets made of polypropylene is improved by the present invention, they can be well bonded to dental materials. The bio-compatibility of medical materials such as vascular grafts, artificial organs, artificial joints, catheters and drainage apparatuses can be improved.

In addition, it is possible that the surface property of various kinds of materials can be improved to give other properties to them, which can provide a further development in applications. The present invention can improve an affinity of water-soluble ink, the property of various kinds of medical/sanitary/cosmetic supplies and textile products for clothing, an adhesion property of orthodontic brackets made of polypropylene and the water wettability and the other physical property of medical materials.

What is claimed is:

1. A method of modifying a polymeric material for improving a hydrophilic property, water absorption property or adhesion property which comprises:

(a) subjecting the polymeric material to an activation step for introducing a double bond or a functional group containing at least a carbonyl group on the surface of the polymeric material to the extent that a trace of the formation of the carbonyl group is observed from a ratio of about 0.2 or less of an absorbance at around 1710 $cm^{-1}$ due to carbonyl groups introduced in the surface of polymeric material to an absorbance of the crystalline region not changed by the activation step by employing a base line method of infrared spectroscopy; and (b) treating the activated polymeric material produced in said activation step with a hydrophilic polymer in the presence of a catalyst or an initiator under conditions effective to produce said modified polymer, wherein the weight increase of the treated polymeric material is less than 5 wt %.

2. The method of modifying a polymeric material according to claim 1 further comprising the step of monomer grafting in the presence or absence of a catalyst or an initiator under conditions effective to produce said modified polymer after step (b).

3. The method according to claim 2, wherein said monomer is a compound having a carbon-carbon double bond.

4. The method according to claim 3, wherein said monomer is at least one of the monomers selected from the group consisting of acrylic acid, methacrylic acid, vinyl acetate, 2-butene acid, ethylene sulfonic acid, hydroxyalkyl acrylate, hydroxyalkyl methacrylate, acryl amide, vinyl pyridine, vinyl pyrrolidone, vinyl carbazole, maleic anhydride and pyromellitic dianhydride.

5. The method according to claim 2, wherein said step of monomer grafting is carried out by any one of or both of the following two methods: (1) heating in the presence of catalysts or initiators and (2) UV irradiation in the presence or absence of catalysts, initiators or photo-sensitizers.

6. The method according to claim 2, wherein said initiators are at least one of peroxides, cerium ammonium nitrate (IV) or persulfates.

7. The method of modifying a polymeric material according to claim 1, further comprising the step of a solvent-treatment prior to the activation step (a), wherein the polymeric material is dipped in a solvent for about 1 minute to 60 minutes at a temperature of about 60° C. or less, and a weight increase of the polymeric material is 10% or less of the original weight.

8. The method of modifying a polymeric material according to claim 1, further comprising the step of a solvent-treatment prior to the activation step (a) and a step of monomer grafting after step (b), wherein in the solvent-treatment the polymeric material is dipped in a solvent for about 1 minute to 60 minutes at a temperature to about 60° C., and a weight increase of the polymeric material is up to 10% of the original weight.

9. The method according to claim 8, wherein said monomer is a compound having a carbon-carbon double bond.

10. The method according to claim 9, wherein said monomer is at least one of the monomers selected from the group consisting of acrylic acid, methacrylic acid, vinyl acetate, 2-butene acid, ethylene sulfonic acid, hydroxyalkyl acrylate, hydroxyalkyl methacrylate, acryl amide, vinyl pyridine, vinyl pyrrolidone, vinyl carbazole, maleic anhydride and pyromellitic dianhydride.

11. The method according to claim 8, wherein said step of monomer grafting is carried out by any one of or both of the following two methods: (1) heating in the presence of catalysts or initiators and (2) UV irradiation in the presence or absence of catalysts, initiators or photo-sensitizers.

12. The method according to claim 1, wherein said polymeric material is a homopolymer or copolymer of one or more compounds selected from the group consisting of: olefins, vinyl compounds except olefins, vinylidene compounds, polyesters, polyamides, polyimides, polyurethanes, polybenzoates, poly(benzoxazole)s, poly(benzthiazole)s, poly-(p-phenylene benzbisoxazole)s, poly-(p-phenylene benzbis-thiazole)s, poly(alkyl-p-hydroxybenzoate)s, poly(benzimidazole)s, carbonized polymeric materials, polyphenols, cellulose acetate, regenerated cellulose, vinylon, polychlal, casein, wool, silk, hemp, ramie, and jute.

13. The method according to claim 1, wherein said polymeric material is in the form of any one of fibers, woven fabrics, knitted webs, non-woven fabrics, plates, rods, films, sheets, porous films, members or parts of molded materials in a given shape or composite materials with other materials.

14. The method according to claim 1, wherein said activation-treatment is at least one of the treatments selected from the group consisting of an ozone treatment, a plasma treatment, a UV irradiation treatment and a high voltage electric discharge treatment.

15. The method according to claim 1, wherein said hydrophilic polymer is at least one member selected from the group consisting of polyvinyl alcohol, carboxymethylcellulose, poly(hydroxy-ethyl methacrylate), poly-α-hydroxy vinylalcohol, polyacrylic acid, polyvinyl pyrrolidone, polyalkylene glycols, starche, silk fibroin, sericin, agar, gelatin, egg white and sodium arginate.

16. The method according to claim 1, wherein said initiators are at least one of peroxides, cerium ammonium nitrate (IV) or persulfates.

17. Writing materials containing modified polymeric materials obtained by the method according to claim 1.

18. Synthetic papers made of modified polymeric materials obtained by the method according to claim 1.

19. Orthodontic brackets containing modified polymeric materials obtained by the method according to claim 1.

* * * * *